(12) United States Patent
Kanamori

(10) Patent No.: US 6,313,924 B2
(45) Date of Patent: *Nov. 6, 2001

(54) IMAGE FORMING APPARATUS AND METHOD OF CORRECTING THE CHARACTERISTIC OF EACH BODY BY PRINTING REFERENCE PATTERN IN THE MACHINE AND READING THE PRINTED PATTERN AGAIN

(75) Inventor: Keiko Kanamori, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,755

(22) Filed: Oct. 29, 1997

(30) Foreign Application Priority Data

Oct. 29, 1996 (JP) .................................................... 8-286721

(51) Int. Cl.$^7$ ...................................................... B41B 1/00
(52) U.S. Cl. ............................................. 358/1.9; 358/521
(58) Field of Search ................................... 382/167, 169, 382/162; 358/518, 296, 1.9, 521, 525, 458, 459, 1.1, 519, 442, 504, 434, 516, 517, 406, 448, 468; 345/603–604

(56) References Cited

U.S. PATENT DOCUMENTS

| | | |
|---|---|---|
| 4,839,722 | 6/1989 | Barry et al. .............................. 358/80 |
| 4,929,978 * | 5/1990 | Kanamori et al. ...................... 355/38 |
| 4,949,135 | 8/1990 | Ng ........................................ 355/327 |
| 5,162,899 | 11/1992 | Naka et al. ............................. 358/89 |
| 5,185,673 * | 2/1993 | Sobol ................................... 358/296 |
| 5,271,096 * | 12/1993 | Cook ................................... 345/431 |
| 5,293,539 | 3/1994 | Spence ................................. 358/527 |
| 5,856,876 * | 1/1999 | Sasanuma et al. ................... 358/300 |
| 5,868,505 * | 2/1999 | Narushima et al. ............ 400/120.09 |

FOREIGN PATENT DOCUMENTS

| | | |
|---|---|---|
| 0 144 188 | 6/1985 | (EP) . |
| 0 398 502 | 11/1990 | (EP) ..................................... 358/518 |
| 0 539 868 | 5/1993 | (EP) ..................................... 358/296 |
| 62-183675 | 8/1987 | (JP) . |

* cited by examiner

*Primary Examiner*—Dov Popovici
(74) *Attorney, Agent, or Firm*—Foley & Lardner

(57) ABSTRACT

An image forming system which reads an image on a document includes a scanner section that serves as an input device for reading an image; a printer section that prints the read image as a hard copy; an operation panel for indicating a characteristic correction data preparation mode on an operation panel, and for inputting an operation start command. An image processing section includes an inner pattern generating section for generating a first reference gradation pattern, a characteristic correcting section that corrects the first reference gradation pattern P1 by use of the first correction data f1 and transmits a second reference gradation pattern P2 to the printer section. A data selecting section transmits the first reference gradation pattern P1 and the first correction data f1 to the characteristic correcting section, and the printer section prints the transmitted second reference gradation pattern P2 on a sheet as a hard copy. The scanner section reads the hard copy of the second reference gradation pattern P2, thereby obtaining a third reference gradation pattern P3. The characteristic correcting section synthesizes the second correction data f2 with the first correction data f1 to generate a third correction data f3. The characteristic correcting section corrects the gradation characteristic of the image information regarding the read image by use of the third correction data f3.

6 Claims, 15 Drawing Sheets

— CORRECTING DATA FORMING MODE —

PLEASE SELECT ONE OF
CORRECTING DATA

1, TYPE 1
2, TYPE 2
3, TYPE 3
4, TYPE 4
5, TYPE 5

FIG. 17

IMAGE FORMING APPARATUS AND METHOD OF CORRECTING THE CHARACTERISTIC OF EACH BODY BY PRINTING REFERENCE PATTERN IN THE MACHINE AND READING THE PRINTED PATTERN AGAIN

BACKGROUND OF THE INVENTION

This invention relates an image processing method of taking in image data by, for example, reading the image on a document with a scanner, performing a specific process on the input image data, and then outputting the image data on paper with an electronic photographic laser printer and an image processing apparatus, such as a digital copying machine, using the image processing method.

With an image processing apparatus, such as a digital copying machine's body dealing with image data, the image data read from a document by a reading device, such as a scanner, is generally digitized, made multi-valued, and processed according to the purpose, and outputted on an output device, such as a laser printer. In this case, because of the characteristics of the scanner acting as the input device and the photosensitive member and laser optical system in the output device, the desired result cannot be obtained without correction.

In general, to correct the characteristic of the entire system, including the characteristics of the scanner of the input device and the photosensitive member and laser optical system in the output device, a gradation correction table used to correct the characteristic of the entire system beforehand is stored in a memory such as a ROM. The characteristic is corrected by referring to the table. In another approach, each image processing device's body is forced to output a thing from which the gradation characteristic can be known, such as a test print. The test print is then supplied to the input device. From the inputted data, a characteristic correction table for correcting the gradation characteristic is formed. The gradation characteristic is corrected to by reference to the table.

Even if the characteristics of the input device, the output device, and the like are obtained beforehand and stored in such a memory as a ROM and a correction is made by reference to the correction data, it is difficult to make a correction appropriate for each image processing apparatus because the characteristics of the scanner, photosensitive member, and laser optical system differ from one image processing apparatus to another.

To make a correction for each image processing apparatus, the gradation data internally generated in the image processing apparatus is printed at the printer section to provide a hard copy. The hard copy is read by the same image processing apparatus that has generated the gradation data. From the read data, the characteristic correction data for correcting the characteristics of the input device and output device is obtained. This approach is very effective theoretically.

Actually, however, when data on each gradation is obtained by generating gradation data, outputting it on the printer section acting as the output device, and supplying the outputted gradation data to the input device, the relationship between the gradation data sent to the output device and that supplied to the input device plotted on the ordinate and abscissa axes is not ideal. Examples of the data are shown in FIGS. 9 and 10.

As shown in the examples, when the data rises sharply or the data contains a part lying as if it were almost parallel with the abscissa, small noise (the portion indicated by "a" in FIG. 9 or the portion indicated by "b" in FIG. 10) may make the characteristic correction data discontinuous or cause the reversal of numerical values in the parts close to the abscissa and ordinate axes.

It is very easy for a person to correct the discontinuity or reversal of the data due to noise, while seeing it with his or her eyes. It is very difficult, however, to do the same thing using calculating expressions. Actually, because of such noises, the characteristic correction data cannot be created exactly.

This causes the problem of being unable to get the linearity as expected theoretically, even if the gradation data is corrected for each digital copying machine.

BRIEF SUMMARY OF THE INVENTION

The object of the present invention is to provide an image processing apparatus for and method of creating ideal characteristic correction data and achieving high shading reproducibility without being affected by the discontinuity of the data and the reversal of numerical values caused by noise in creating characteristic correction data used to correct the input and output characteristics of the entire image processing system.

The foregoing object is accomplished by providing an image forming apparatus which includes the input function of taking in image data on a document by scanning and the output function of forming an image on the basis of the image data, the image forming apparatus comprising: means for generating a first gradation pattern with a plurality of density areas; first formation means for correcting the first gradation pattern on the basis of a first correction data item previously stored to produce a second gradation pattern and forming the second gradation pattern on a first image medium by use of the output function; means for taking in the second gradation pattern on the first image medium by use of the input function and generating a third gradation pattern; means for creating a second correction data item used to make a correction so that the density in each of a plurality of density areas of the third gradation pattern may be essentially equal to the density in each of a plurality of density areas of the first gradation pattern; combining means for combining the first correction data item and the second correction data item to generate a third correction data item; and second formation means for correcting the image data entered by the input function on the basis of the third correction data item and forming the corrected image data on a second image medium.

With the above configuration, the present invention produces the following effect. To create correction data used to correct the gradation characteristic for each model of copying machine, a gradation pattern P1 serving as an ideal reference in a digital copying machine is generated (see FIG. 16). The gradation pattern P1 is corrected using a first correction data item fl and then printed so that it may be used to correct the deviation in the output system including the printer section to provide an ideal relationship between the input and the output. The printed gradation pattern P2 is read by the scanner, which produces a third gradation pattern P3 including the deflection in the input system including the scanner section. Next, a second correction data item f2 used to make a correction so that the third gradation pattern P3 may be equivalent to the first gradation pattern P1 acting as the original reference. Specifically, a combination data is obtained on the basis of the prepared first correction data f1 and the made second correction data f2. The combination of correction data items f1 and f2 is determined to be a third correction data item f3 used to correct the deflection in the entire machine of the model. In an ordinary process, a document image is inputted and corrected using the third correction data item. This removes the deflection in both of the input system including the scanner section and the output section including the printer section, or the deflection in the entire machine. Therefore, it is possible to provide a digital copying machine that makes a correction, taking into account the deflection in the machine itself, and reproduces the gradation density of the image of the document with fidelity.

The foregoing object is also accomplished by providing a method of correcting the gradation characteristic of an image forming apparatus which includes the input function of taking in image data on a document by scanning and the output function of forming an image on the basis of the image data, the method includes the step of generating a first gradation pattern with a plurality of density areas; a first formation step of correcting the first gradation pattern on the basis of a first correction data item previously stored to produce a second gradation pattern and forming the second gradation pattern on a first image medium by use of the output function; the step of taking in the second gradation pattern on the first image medium by use of the input function and generating a third gradation pattern; a step of creating a second correction data item used to make a correction so that the density in each of a plurality of density areas of the third gradation pattern may be essentially equal to the density in each of a plurality of density areas of the first gradation pattern; and a combining step of combining the first correction data item and the second correction data item to generate a third correction data item.

Like the image forming apparatus, the method of correcting the gradation characteristic of the present invention makes it possible to provide an image forming apparatus capable of reproducing a gradation image with fidelity by making the second correction data f2 and composing the first and second correction data f1, f2.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 17 shows an example of the display of the operation panel on which the desired correction data item is to be selected.

DETAILED DESCRIPTION OF THE INVENTION

Hereinafter, referring to the accompanying drawings, embodiments of the present invention will be explained.

1. Configuration

Figure 1:
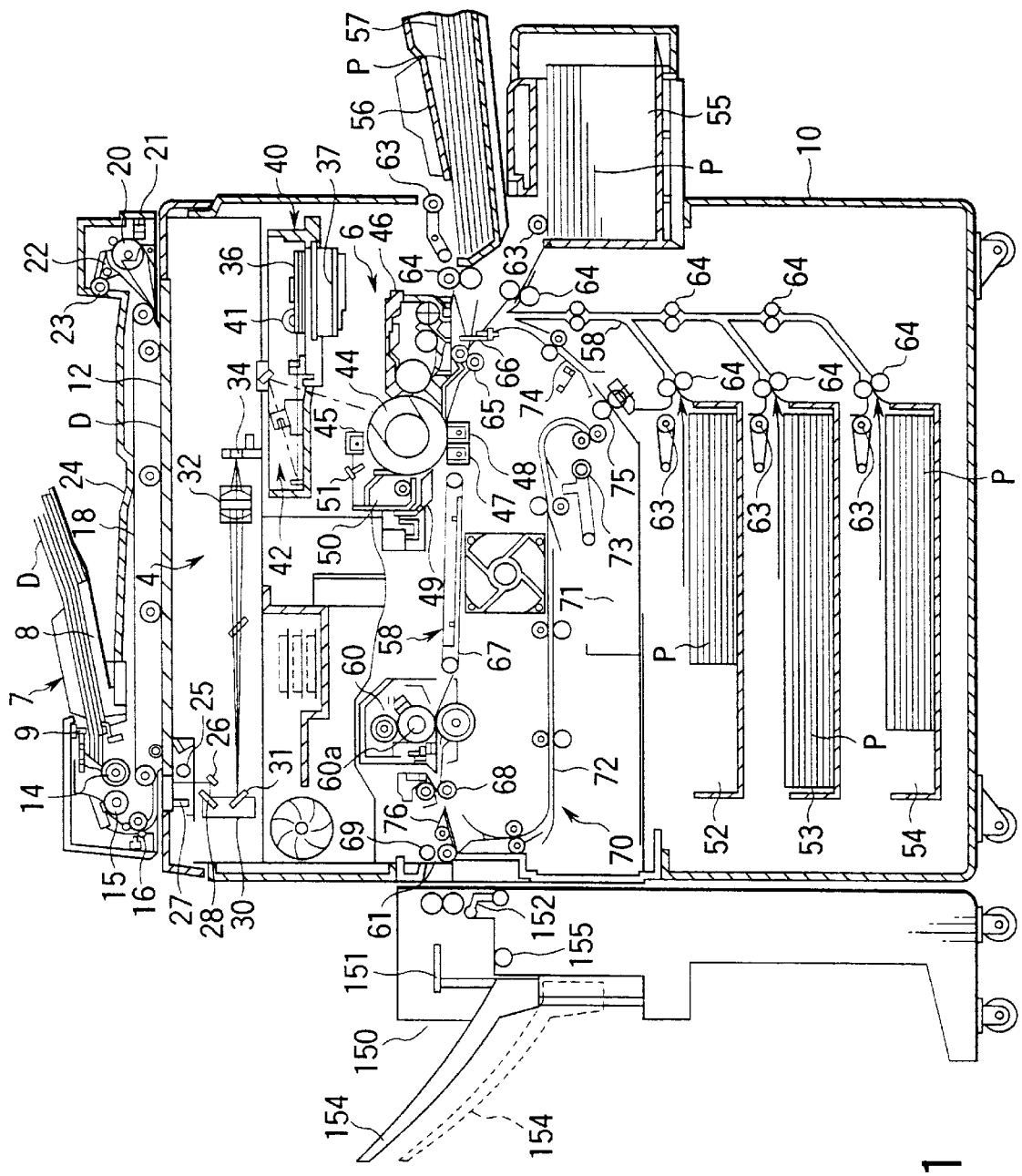
FIG. 1 is a side view of the internal configuration of a digital copying machine according to a first embodiment of the present invention.

FIG. 1 shows the internal configuration of a digital copying machine as an example of an image processing apparatus according to a first embodiment of the present invention. The digital copying machine is, for example, a composite copying machine having three functions: the function of a copying machine, that of a facsimile, and that of a printer.

In FIG. 1, a scanner section 4 acting as an input device and a reading device and a printer section 6 acting as an output device and an image forming device are provided in the apparatus body 10.

On the top of the apparatus body 10, there is provided a document table 12 composed of a transparent glass on which a document D to be read is placed. On the top of the apparatus body 10, too, there is provided an automatic document feed 7 (hereinafter, abbreviated as ADF) that automatically feeds the document D onto the document table 12. The ADF 7 is provided on the document table 12 so that it can open and close and also functions as a document weight that forces the document D to come in close contact with the document table 12.

The ADF 7 is composed of a document tray 8 in which the document D is set, an empty sensor 9 for sensing the presence or absence of a document, a pickup roller 14 for picking up the document D sheet by sheet from the document tray 8, a paper feed roller 15 for transporting the picked-up document D, an aligning roller pair 16 for aligning the leading edge of the document D, and a transport belt 18 provided in a manner that covers almost all the top of the document table 12. A plurality of documents D set in the document tray 8 face up is picked out, starting with the bottommost page, or the last page. The picked-out page is positioned in place by the aligning roller pair 16 and then transported by the transport belt 18 to a specific position on the document table 12.

In the ADF 7, at the end of the opposite side of the aligning roller pair 16 across the transport belt 18, a reversing roller 20, a non-reversing roller 21, a flapper 22, and a discharge roller 23 are provided. The document D from which the image data has been read by the scanner section 4 is transported by the transport belt 18 from the top of the document table 12 and discharged onto a document discharge section 24 on the top of the ADF 7 via the reversing roller 20, flapper 22, and discharge roller 23. To read the reverse side of the document D, switching the flapper 22 causes the reversing roller 20 to reverse the document D transported by the transport belt 18. Thereafter, the transport belt 18 carries it to a specific position on the document table 12.

The scanner section 4 provided in the apparatus body 10 includes an exposure lamp 25 serving as a light source that illuminates the document D on the document table 12 and a first mirror 26 for reflecting the reflected light from the document D in a specific direction. The exposure lamp 25 and first mirror 26 are provided on a first carriage 27 provided below the document table 12. The first carriage 27 is provided so as to move in parallel with the document table 12. The first carriage is moved back and forth below the document table 12 by a driving motor via a toothed belt (not shown).

Below the document table 12, a second carriage 28 is provided so as to move in parallel with the document table 12. On the second carriage 28, a second and third mirrors 30 and 31 that reflect, in that order, the light from the document D reflected by the first mirror 26 are provided at right angles to each other. The second carriage 28 is moved by the toothed belt driving the first carriage so that it may follow the movement of the first carriage 27 in such a manner that it moves in parallel with the document table 12 at a speed half that of the first carriage.

Below the document table 12, there are provided an image forming lens 32 for concentrating the reflected light from the third mirror 31 on the second carriage 28 and a CCD line sensor 34 acting as a photoelectric conversion device for receiving the reflected light converged by the image forming lens 32 and converting it photoelectrically. The image forming lens 32 is provided in a plane including the optical axis of the light reflected from the third mirror 31 in such a manner that it can move via a driving mechanism. The movement of the image forming lens enables the reflected light to form an image at the desired magnification. Then, the line sensor 34 converts the incident reflected light photoelectrically and outputs the electric signal corresponding to the read document D.

The printer section 6 includes a laser exposure device 40 acting as a latent image forming device. The laser exposure device 40 comprises a semiconductor laser oscillator 41 acting as a light source, a polygon mirror 36 serving as a scanning member for continuously deflecting the laser light emitted from the semiconductor laser oscillator 41, a polygon motor 37 acting as a scanning motor for rotating the polygon mirror 36 at the specified number of revolutions explained later, and an optical system 42 for deflecting the laser light from the polygon mirror 36 and directing it to the photosensitive drum 44. The laser exposure device 40 having such a construction is fixed to a support frame (not shown) of the apparatus body 10.

The semiconductor laser oscillator 41 is turned on and off according to image data on the document D read by the scanner section 4 or data on the document transmitted or received by facsimile. The laser light is directed to the photosensitive drum 44 via the polygon mirror 36 and optical system 42. Exposing and scanning the peripheral surface of the photosensitive drum 44, the laser light forms an electrostatic latent image on the peripheral surface of the photosensitive drum 44.

The printer section 6 also has the fully rotary photosensitive drum 44 acting as an image-retaining member provided almost in the center of the apparatus body 10. The peripheral surface of the photosensitive drum 44 is exposed and scanned by the laser light from the laser exposure device 40, thereby forming the desire latent image. Around the photosensitive drum 44, there are provided, in this order, an electrification charger 45 for electrifying the peripheral surface of the photosensitive drum 44 with a specific charge, a developing unit 46 acting as a developing device for supplying toner acting as a developer to the electrostatic latent image formed on the photosensitive drum 44 to develop the image with the desired image density, a peeling charger 47 for peeling from the photosensitive drum 44 a paper sheet P serving as an image forming medium supplied from a paper feed cassette explained later, a transfer charger 48 for transferring the toner image formed on the photosensitive drum 44 to the paper sheet P, a peeling claw 49 for peeling the paper sheet P from the peripheral surface of the photosensitive drum 44, a cleaning device 50 for removing the remaining toner from the peripheral surface of the photosensitive drum 44, and a discharger 51 for discharging the peripheral surface of the photosensitive drum 44.

In the lower part of the apparatus body 10, an upper-stage paper feed cassette 52, a middle-stage paper feed cassette 53, a lower-stage paper feed cassette 54 are stacked one on top of another in a removable manner. In each of the paper feed cassettes 52 to 54, sheets of paper P of different sizes are loaded. On the side of these paper feed cassettes 52 to 54, a large-capacity feeder 55 is provided. The large-capacity feeder 55 houses sheets of paper P of a frequently used size, for example, about 3000 sheets of paper of size A4. Above the large-capacity feeder 55, a paper feed cassette 57 also serving as a manual feed tray 56 is provided in a detachable manner.

In the apparatus body 10, a transport path 58 extends from each of the paper feed cassettes 52 to 54 and the large-capacity feeder 55 and passes through the transfer section between the photosensitive drum 44 and the transfer charger 48. At the end of the transport path 58, a fixing device 60 with a fixing lamp 60a is provided. In the sidewall of the apparatus body 10 facing the fixing device 60, an outlet 61 is formed. In the outlet 61, the single-tray finisher 150 is installed.

In the vicinity of not only the upper-stage paper feed cassette 52, middle-stage paper feed cassette 53, and lower-stage paper feed cassette 54 but also the large-capacity feeder 55, there is provided a pickup roller 63 for picking up paper sheets P one by one from the paper feed cassettes 52, 54, 57 or large-capacity feeder 57. In the transport path 58, there are provided a large number of paper feed roller pairs 64 for transporting the paper sheet P picked up by the pickup roller 63 over the transport path 58.

In the transport path 58, a resist roller pair 65 is provided on the upstream side of photosensitive drum 44. The resist roller pair 65 corrects the inclination of the picked-up paper sheet P aligns the leading edge of the toner image on the photosensitive drum 44 with the leading edge of the paper sheet P. The resist roller pair then supplies the paper sheet P to the transfer section at the same speed as the moving speed of the peripheral surface of the photosensitive drum 44. In front of the resist roller pair 65, or on the side of the paper feed roller 64, a pre-aligning sensor 66 for sensing the arrival of the paper sheet P is provided.

The paper sheet P picked up one by one by the pickup roller 63 from one of the paper feed cassettes 52 to 54, 57 or the large-capacity feeder 55 is sent to the resist roller pair 65 by the paper feed roller pair 64. Then, the leading edge of the paper sheet P is positioned in place by the resist roller pair 65 and thereafter the sheet is sent to the transfer section.

In the transfer section, the developer image, or the toner image, formed on the photosensitive drum 44 is transferred onto the paper sheet P by the transfer charger 48. The paper sheet P on which the toner image has been transferred is peeled from the peripheral surface of the photosensitive drum 44 by the action of the peeling charger 47 and peeling claw 49. The peeled sheet is transferred to the fixing device 60 via a transport belt 67 forming part of the transport path 52. After the fixing device 60 melt-fixes the developer image onto the paper sheet P, the sheet P is passed through the outlet 61 by a paper feed roller pair 68 and a discharge roller pair 69 and is delivered onto a finisher 150.

Below the transport path 58, an automatic reversing device 70 for reversing the paper sheet P passed through the fixing device 60 and sending back the sheet to the resist roller pair 65. The automatic reversing device 70 includes a temporal accumulation section 71 for temporarily accumulating the paper sheets P, a reversing path 72 that branches off the transport path 58 and that reverses the paper sheet P passed through the fixing device 60 and directs it to the temporal accumulation section 71, a pickup roller 73 for picking up the paper sheets P one by one from the temporal accumulation section 71, and a paper feed roller 75 for supplying the picked-up paper sheet P to the resist roller pair 65 via the transport path 74. At the branching section between the transport path 58 and the reversing section 72, an apportioning gate 76 for apportioning the paper sheet P to the outlet 61 or to the reversing path 72.

To copy the document on both sides of paper, the paper sheet P passed through the fixing device 60 is directed by the apportioning gate 76 to the reversing path 72. Then, the sheet is temporarily accumulated in the temporal accumulation section 71 with the back of the sheet upward. Thereafter, the sheet is sent by the pickup roller 73 and paper feed roller pair 57 to the resist roller pair 65 via the transport path 74. After the paper sheet P is positioned in place by the resist roller pair 65, it is sent back to the transfer section, which transfers the toner image onto the back of the paper sheet P. Then, the paper sheet P is delivered to the finisher 150 via the transport path 58, fixing device 60, and discharge roller 69.

The finisher 150 staples the delivered documents in units of a copy and accumulates them. Each time a sheet of paper P to be stapled is delivered from the outlet 61, a guide bar 151 moves the sheet to the side on which it is to be stapled and aligns it. After all the sheets have been delivered, a paper clamp arm 152 holds down a copy of paper sheets P delivered and a stapler unit (not shown) staples it.

Thereafter, the guide bar 151 goes down and the stapled paper sheets P are delivered in units of a copy by a finisher discharge roller 155 to a finisher delivery tray 154. How much the finisher delivery tray 154 goes down is determined to some extent by the number of paper sheets P discharged. Each time a copy of document is delivered, the tray goes down stepwise. The guide bar 151 for aligning the discharged paper sheet P is located at such a height as prevents the bar from coming into contact with the stapled paper sheets P on the finisher delivery tray 154.

The finisher delivery tray 154 is connected to a shift mechanism (not shown) that shifts the documents copy by copy (for example, in four directions: the front, the rear, the right, and the left) in the sort mode.

In the upper part of the front of the apparatus body 10, there is provided an operation panel (not shown) is provided which not only is used to enter various copy conditions and instructions including a copy start instruction to start a copy operation but also displays operation statuses.

Figure 2:
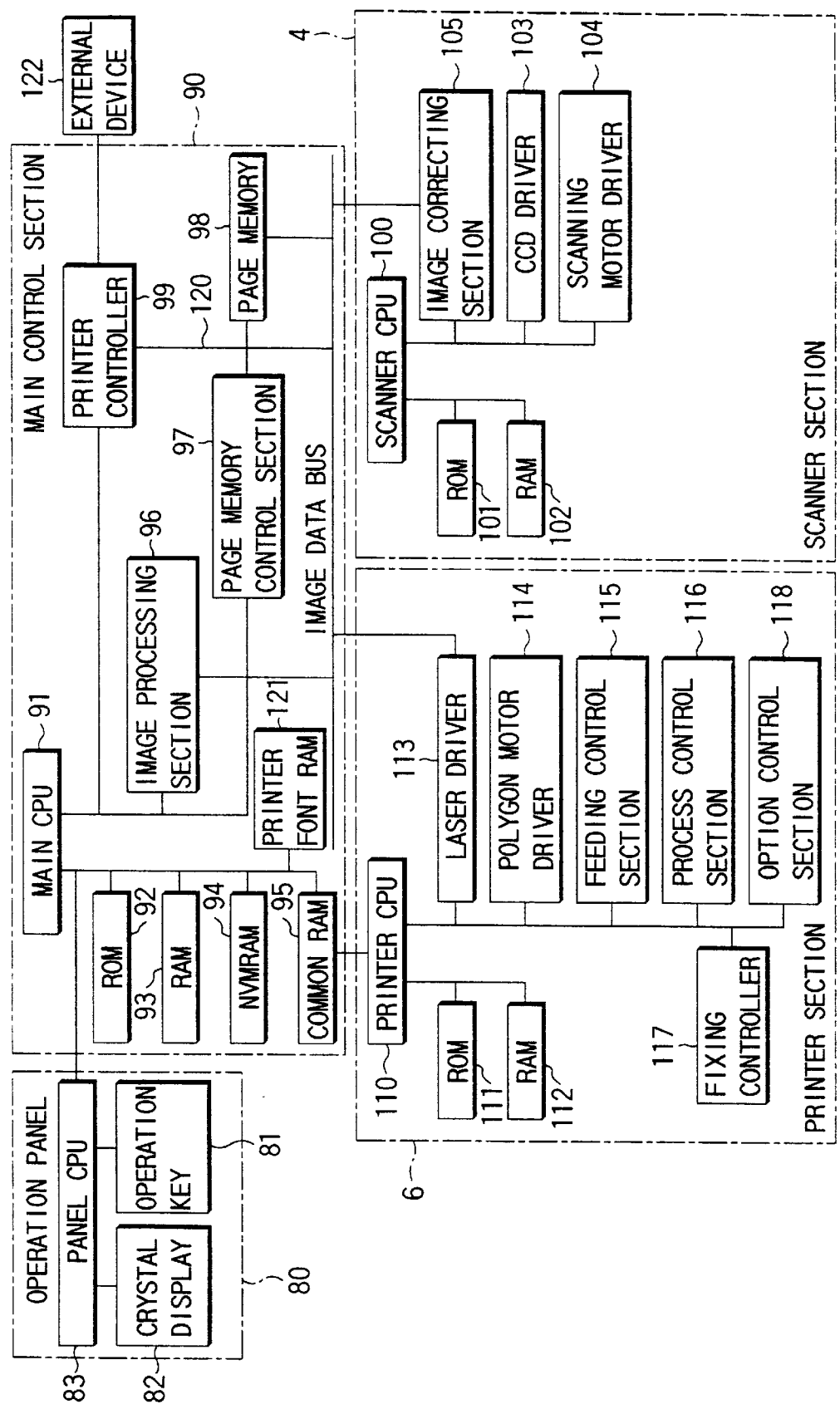
FIG. 2 is a schematic block diagram of the digital copying machine of FIG. 1.
Figure 3:
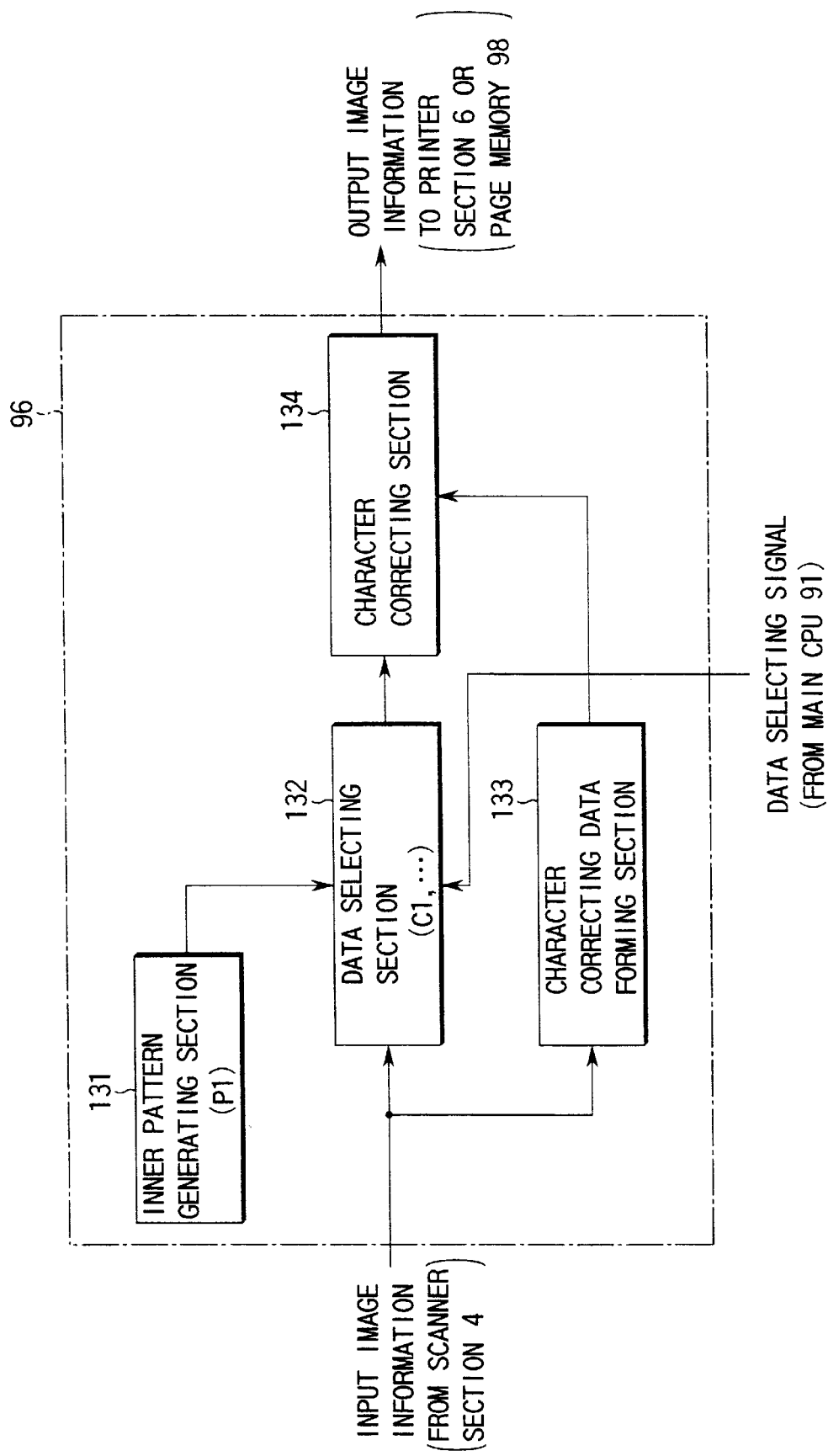
FIG. 3 is a block diagram of the image processing section.

FIG. 2 is a schematic block diagram of the digital copying machine of FIG. 1. In FIG. 2, the control system is composed of three CPUs (central processing units): a main CPU 91 in a main control section 90, a scanner CPU 100 in the scanner section 4, and a printer CPU 110 in the printer section 6.

The main CPU 91 performs two-way communication via the printer CPU 110 and a common RAM 95. The main CPU 91 gives an operation instruction and the printer CPU 110 returns a condition status. The printer CPU 110 and scanner CPU 110 perform serial communication. The printer CPU 110 gives an operation instruction and the scanner CPU 100 returns a condition status.

The operation panel 80 has various operation keys 81, a liquid-crystal display section 82, and a panel CPU 83 to which these are connected. The operation panel is connected to the main CPU 91.

The control section 90 comprises the main CPU 91, a ROM 92, a RAM 93, an NVRAM 94, the common RAM 95, an image processing section 96, a page memory control section 97, a page memory 98, a printer controller 99, and a printer font ROM 121.

The main CPU 91 supervises the entire control. The ROM 92 stores control programs and the like. The RAM 93 stores data temporarily.

The NVRAM (nonvolatile RAM) 94 is a nonvolatile memory backed up by a battery (not shown) and is designed to retain the stored data even when the power supply is turned off.

The common RAM 95 is used to perform two-way communication between the main CPU 91 and the printer CPU 110.

The page memory control section 97 writes image data into or reads image data from the page memory 98. The page memory 98 has an area that can store pages of image data. The page memory is capable of storing, page by page, the data obtained by compressing the image data from the scanner section 4.

The printer font ROM 121 stores the font data corresponding to the print data. Using the font data stored in the printer font ROM 121, the printer controller 99 develops the print data from an external apparatus 122, such as a personal computer, into image data with the resolution specified by the print data.

The scanner section 4 comprises a scanner CPU 100 for supervising the entire control, a ROM 101 for storing control programs and the like, a RAM 102 for storing data, a CCD driver 103 for driving the line sensor 34, a scanning motor driver 104 for controlling the rotation of the scanning motor that moves the exposure lamp 25 and mirrors 26, 27, 28, and an image correcting section 105.

The image correcting section 105 comprises an A/D conversion circuit for converting the analog signal from the line sensor 34 into a digital signal, a shade correcting circuit for correcting the fluctuation of the threshold level of the output signal from the line sensor 34 due to changes in the ambient temperature, and a line memory for temporarily storing the digital signal subjected to shade correction at the shade correcting circuit.

The printer section 61 comprises a printer CPU 110 that controls the entire control, a ROM 111 for storing control programs and the like, a RAM 112 for storing data, a laser driver 113 for driving the semiconductor laser oscillator 41, a polygon motor driver 114 for driving the polygon motor 37 in the laser exposure device 40, a transport control section 115 for controlling the transport of the paper sheet P over the transport path 58, a process control section 116 for controlling the process of performing electrification, development, and transfer using the electrification charger 45, developing unit 46, and transfer charger 48, a fixing controller 117 for controlling the fixing device 60, and an option control section 118 for controlling an option.

The image processing section 96, page memory 98, printer controller 99, image correcting section 105, and laser driver 113 are connected to each other with an image data bus 120.

The image processing section 96 corrects the gradation characteristic (or the density characteristic) of the image data read by the scanner section 4. The image processing section comprises, for example, an internal pattern generating section 131 acting as a gradation pattern generating device for generating gradation patterns changing stepwise, a correction data select section 132 for selecting either the gradation pattern generated at the internal pattern generation section 131 or the image data inputted by the scanner section 4 and outputting the selected one, a characteristic correction data creation section 133 for creating characteristic correction data from the gradation pattern inputted by the scanner section 4, and a characteristic correcting section 134 for correcting the gradation of the image data selected at the correction data select section 132.

Figure 16:
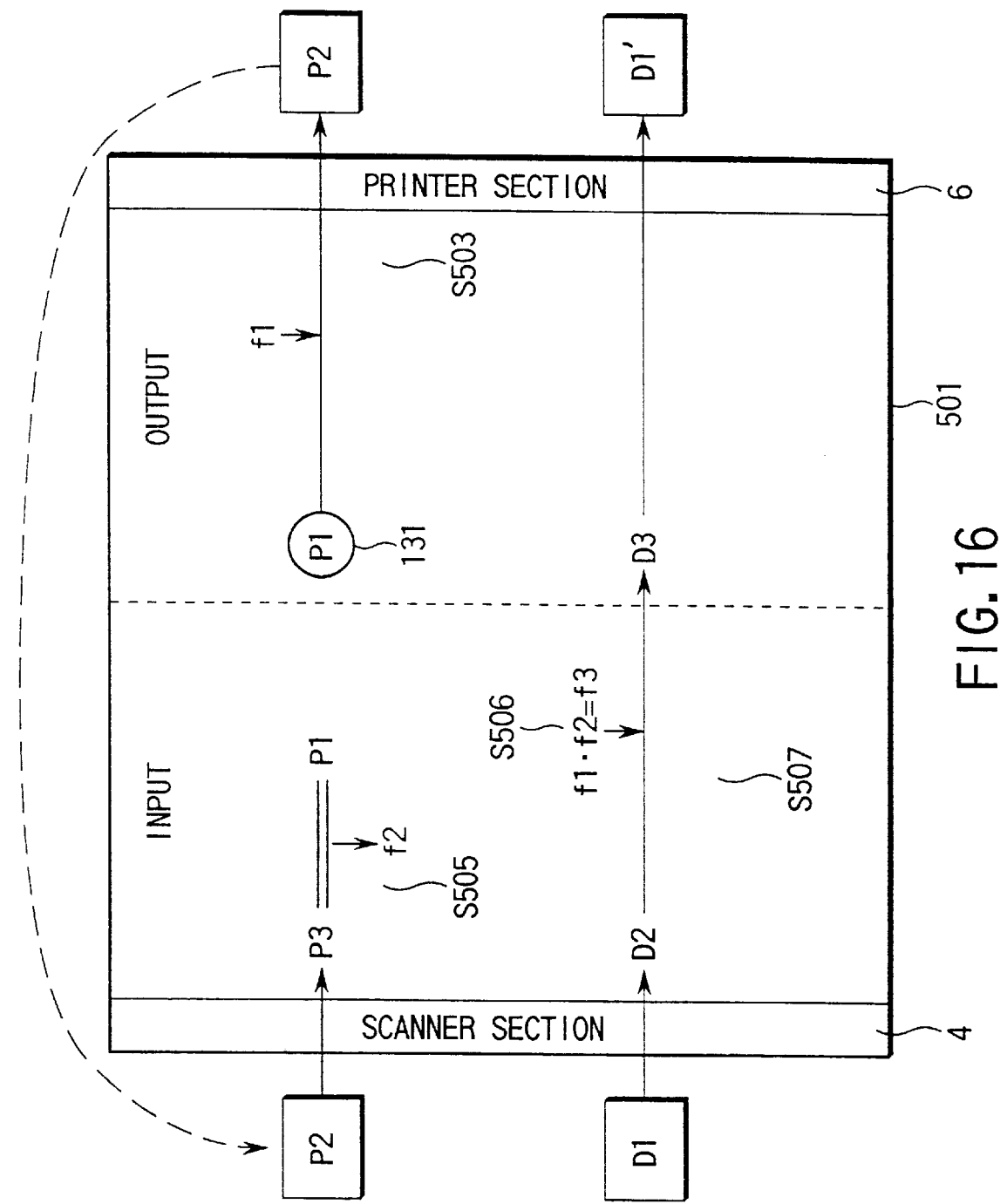
FIG. 16 is a conceptual diagram to help explain the principle of the present invention.

2. Principle With the above-described configuration, a characteristic correcting method for each machine of the present invention is carried out so that each of the density gradations may have an ideal density value in the digital copying system. The method is based on the principle explained below. FIG. 16 is a diagram to help explain the principle of the present invention.

In FIG. 16, after a first reference gradation pattern P1 (in the ideal form) generated in an image forming apparatus 501 is corrected on the basis of a first correction data item f1 to correct the deflection in the output system including the printer section, it is printed as a second reference gradation pattern P2 (S503). Then, the printed second reference gradation pattern P2 is read by the scanner section, which supplies the read pattern P2 as a third reference gradation pattern P3 including the deflection in the input system to the copying machine. The third reference gradation pattern P3 is corrected on the basis of a second correction data item f2 so that the third reference gradation pattern P3 may approach to the first reference gradation pattern P1 (in the ideal form). As a result, the third reference gradation pattern P3 takes the ideal value close to that of the first reference gradation pattern P1. In other words, such a second correction data item f2 as causes the third reference gradation pattern P3 to approach to the ideal first reference gradation pattern P1 is determined (S505).

Finally, a combination of the first correction data item f1 and second correction data item f2 is used as a correction value for use in a normal image forming process.

That is, a third correction data item f3 used to correct the deflection in the entire machine is created by combining the second correction data item f2 used to correct the deflection in the input system including the scanner and the first correction data item f1 used to correct the deflection in the output system including the printer section. In an ordinary process, the original document image D1 is read by the scanner section. Then, the image D2 including the deflection in the input system is corrected on the basis of the third correction data item f3 used to correct the defection in the entire machine. After the third correction, the image D3 is formed. Printing the image D3 on the printer section provides a printed image D1' with a density distribution closest to that of the original document image D1 (S507). The reason is that the third correction data item f3 has a value used to correct the deflections in the input system and output system. This enables the image characteristic of the inputted original document image D1 to be reproduced with fidelity in printing.

Figure 9:
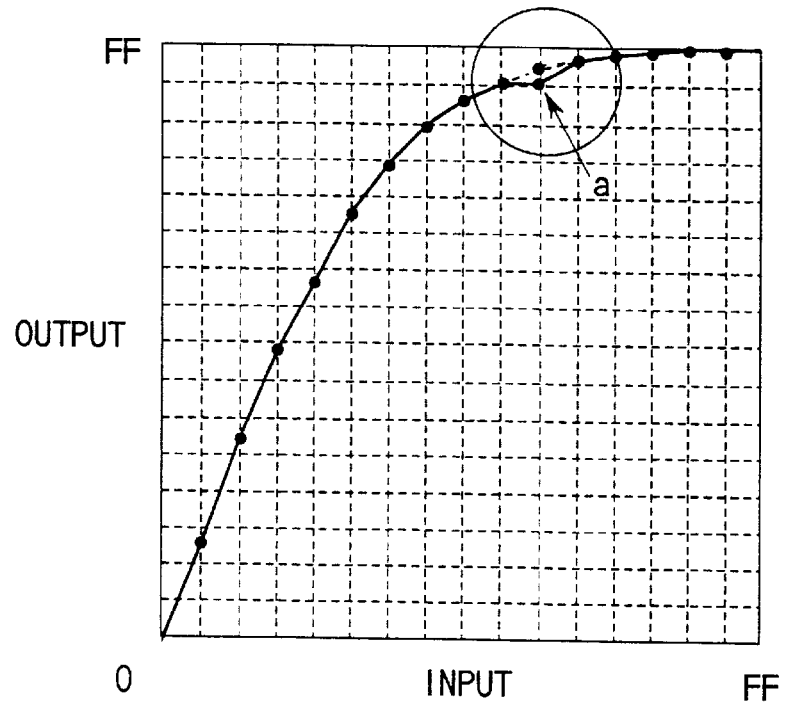
FIG. 9 shows a problematic data item in the relationship between the internally generated gradation pattern and the resulting gradation pattern obtained when the outputted gradation pattern is supplied to the input device.
Figure 10:
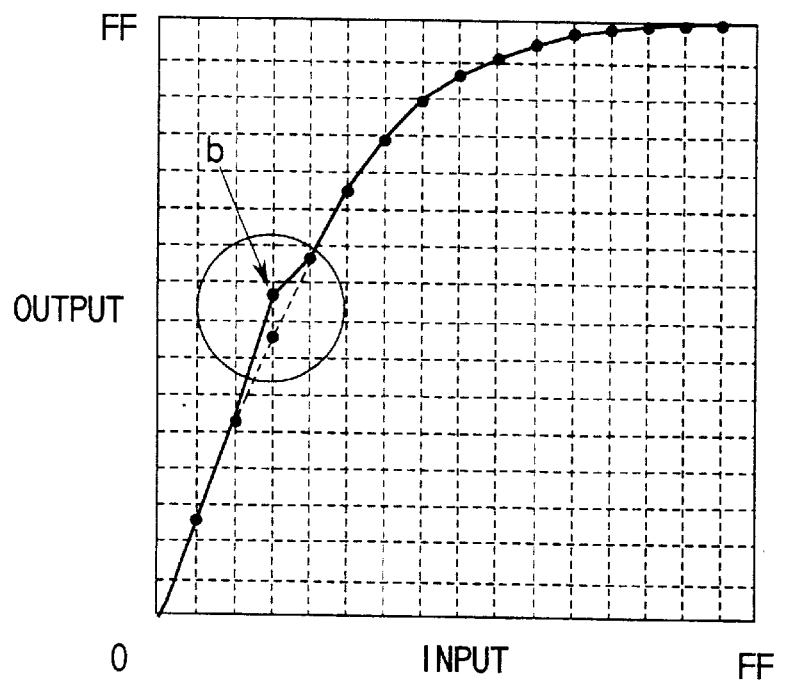
FIG. 10 shows another problematic data item differing from that of FIG. 9 in the relationship between the internally generated gradation pattern and the resulting gradation pattern obtained when the outputted gradation pattern is supplied to the input device.

Accordingly, the character correcting method offers a step of correcting the first standard pattern P1 with the first correction data f1, and then data shown in FIGS. 9 and 10 would be corrected to the data shown 8. Therefore, it produces the image forming apparatus less affected by noise and realizes more precise calculation for the correction data.

3. First Embodiment

Figure 4:
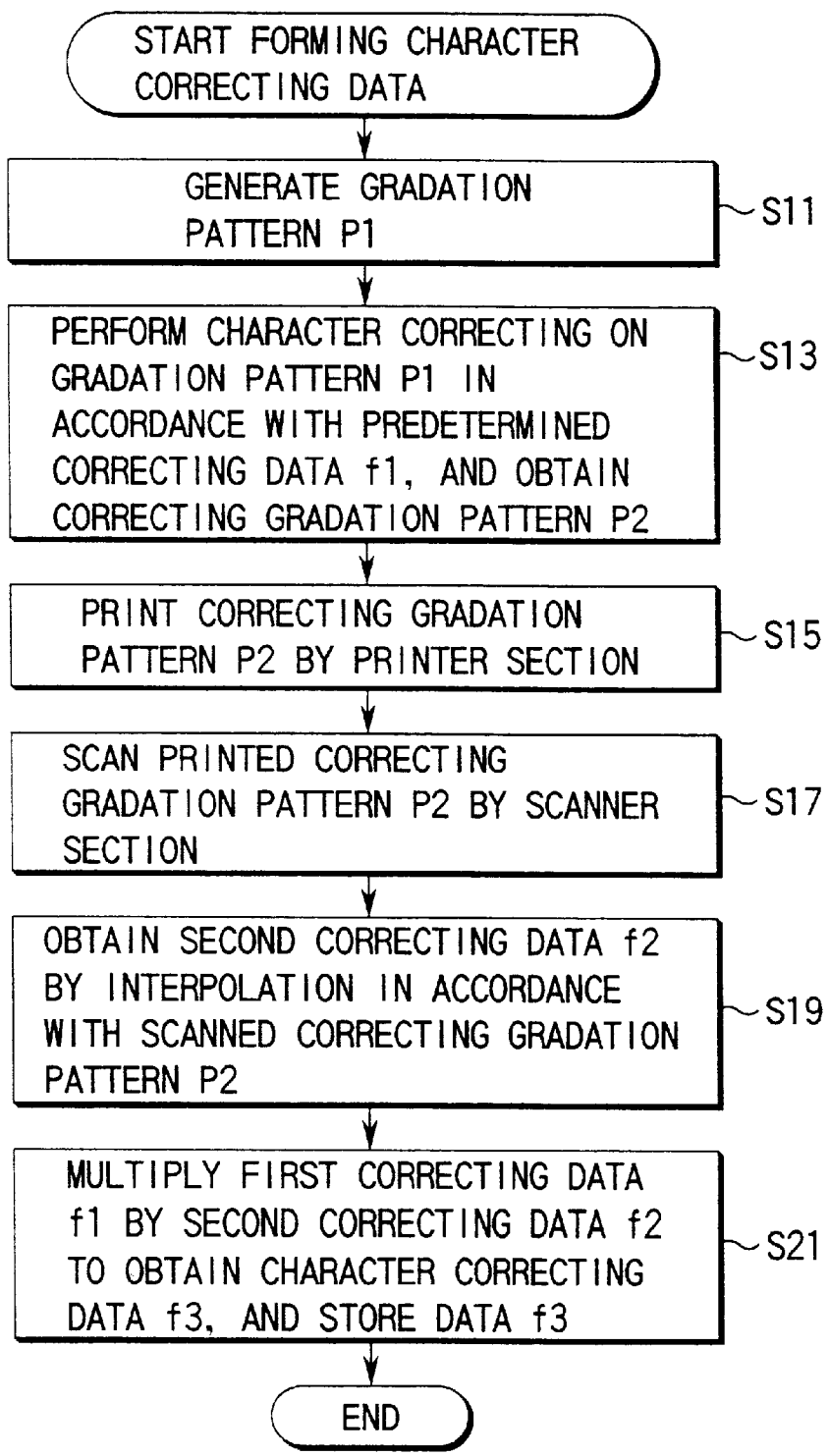
FIG. 4 is a flowchart to help explain a characteristic correction method in the image processing section.

The characteristic correcting method in the image processing section 96 operating on the aforementioned principle will be explained in detail by reference to the flowchart of FIG. 4.

Explanation will be given on the assumption that the multi-valued level in inputting image data is expressed in eight bits and the multi-valued level in outputting image data is expressed in seven bits.

First, when the operator sets, for example, the characteristic correction data creation mode by operating a specific key on the operation panel 80 and enters an operation start instruction, the internal pattern generating section 131 generates a gradation pattern P1 that changes stepwise (S11). The generated gradation pattern P1, together with the one f1 of a plurality of correction data items (f1, f1-2, f1-3, . . . ) selected by the data select signal given from the main CPU 91, is sent to the characteristic correcting section 134.

In a method of selecting a correction data item, the operator selects the best correction data item from the select screen on the operation panel shown in FIG. 17.

The characteristic correcting section 134 corrects the gradation pattern P1 from the internal pattern generating section 131 by use of the selected characteristic correction data item (referred to as the first correction data item f1) and sends the corrected gradation pattern P2 to the printer section 6 (S13). The printer section 6 prints the corrected gradation pattern from the characteristic correcting section 134 on the paper sheet P as a hard copy (S15).

Instead of selecting one of a plurality of characteristic correction data items, one characteristic correction data item may be given beforehand and the gradation pattern be corrected using the characteristic correction data item without the select process.

Figure 5:
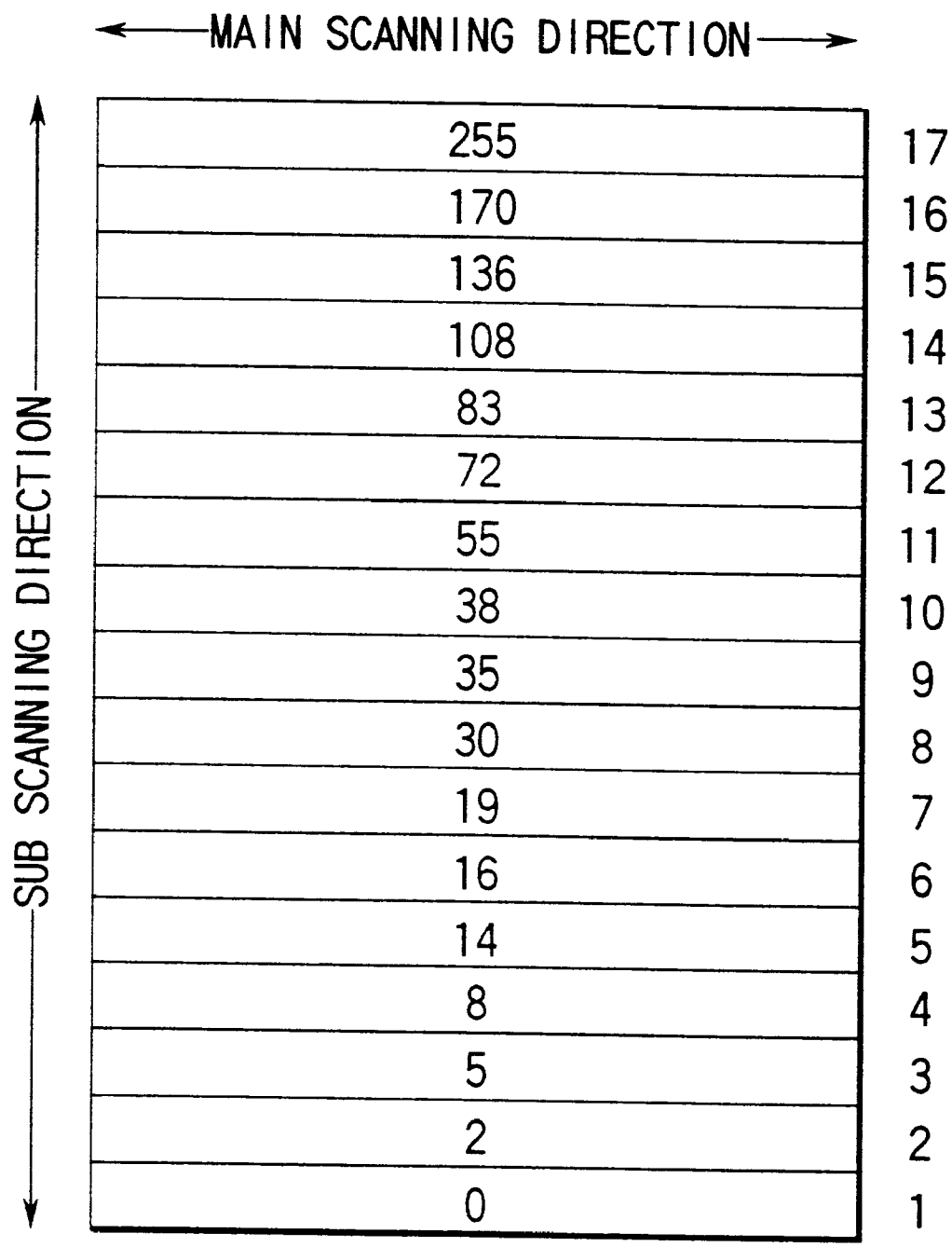
FIG. 5 shows an example of a gradation pattern outputted on paper to provide a hard copy.

FIG. 5 shows an example of the gradation pattern P2 of the outputted hard copy. The numerals (0, 2, 5, . . . , 170, 255) in the figure represent the density values of the individual patterns.

Figure 6:
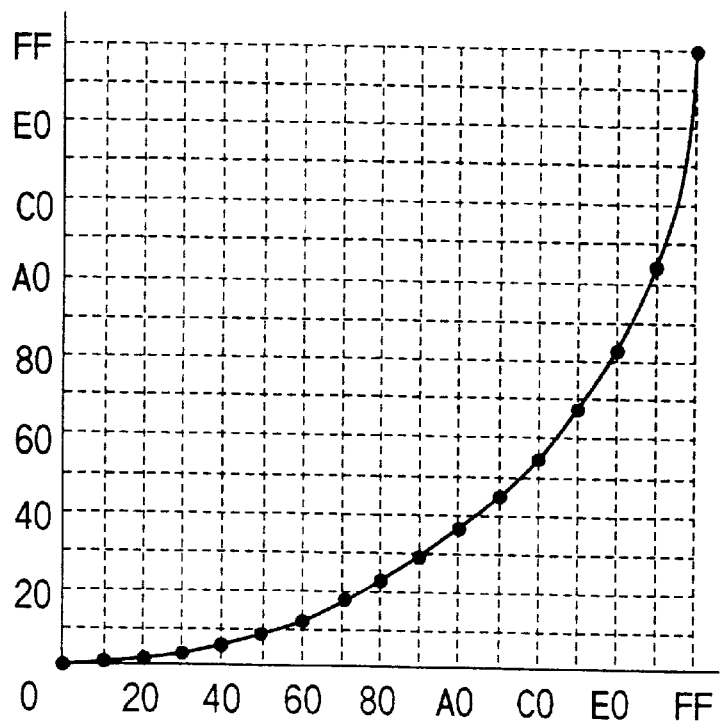
FIG. 6 shows a first correction data item used to correct the gradation characteristic of the gradation pattern.

The first correction data f1 set in the characteristic correcting section 134 is, for example, a correction curve as shown in FIG. 6. Specifically, it is characteristic correction data on a correction curve where the relationship between the signal before correction and the signal in the portion corresponding to each output signal after the input is almost linear, when the gradation characteristic of the hard copy outputted from the printer section 6 is supplied from the scanner section 4.

As described above, before the gradation pattern from the internal pattern generating section 131 is outputted in the form of a hard copy, part of the characteristic is corrected and outputted. This corrects the characteristic of the system to some extend, not all of the characteristic though. As a result, the characteristic of the outputted hard copy approaches to a linear one.

Then, the hard copy outputted from the printer section 6 is set in the scanner section 4. The scanner section 4 reads the gradation pattern P2 of the hard copy to produce a gradation pattern P3 (S17). The inputted gradation pattern P3 is sent to the characteristic correction data creation section 133. The characteristic correction data creation section 133 finds the value of each gradation by sampling a data item for each gradation of the gradation pattern. Hereinafter, a data sampling method and a method of finding the value of each gradation will be explained.

The gradation pattern generated at the internal pattern generating section 131 is, for example, a pattern where an image signal changes in the feed direction stepwise as shown in FIG. 5. Explanation will be given using a case where the number of stages at which the pattern changes is seventeen.

The internal pattern generating section 131 generates each gradation pattern P1 in the form of data items changing at regular intervals: 0, 10, 20, 30, 40, 50, 60, 70, 80, 90, A0, B0, C0, D0, E0, F0, FF (hex). The data items are corrected at the characteristic correcting section 134 and outputted on the printer section 6. The gradation pattern P2 internally generated, corrected, and outputted is taken in again by the scanner section 4 as described above. The scanner section samples the inputted gradation pattern P3 gradation by gradation.

Figure 7:
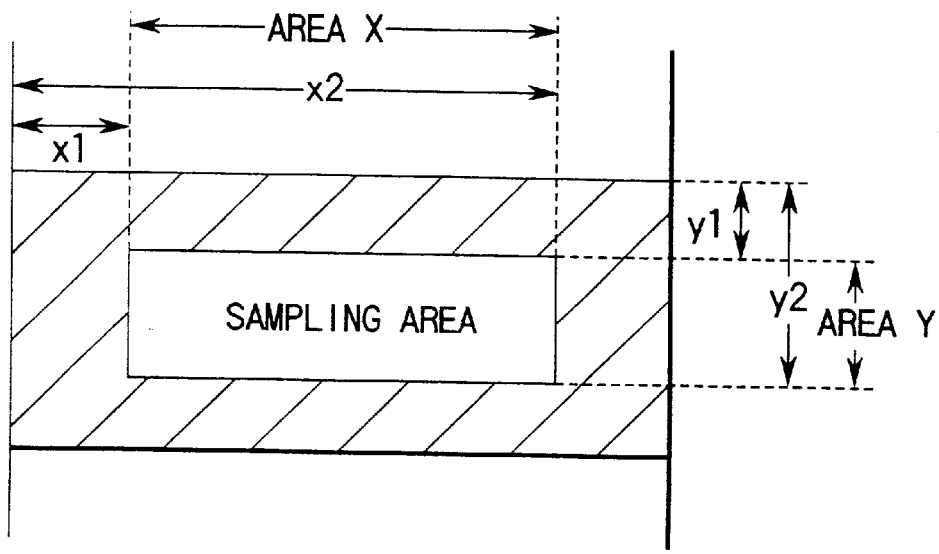
FIG. 7 is a drawing to help explain an area where the value of each gradation in the inputted gradation pattern is sampled.

To find the value of each gradation, for example, a highly stable portion is sampled in the area shown in FIG. 7. Since the peripheral part of each gradation lacks stability, the area expressed by range X (x2−x1) and range Y (y2−y1) is sampled with a sampling pitch of p (that is, sampling is done at a rate of one sample every a p number of pixels). The value of the relevant gradation is determined by dividing the sum total of sample pixel values by the sum total of sample pixels. The portion where sampling is done for each gradation can be changed arbitrarily and set in the desired area.

Figure 8:
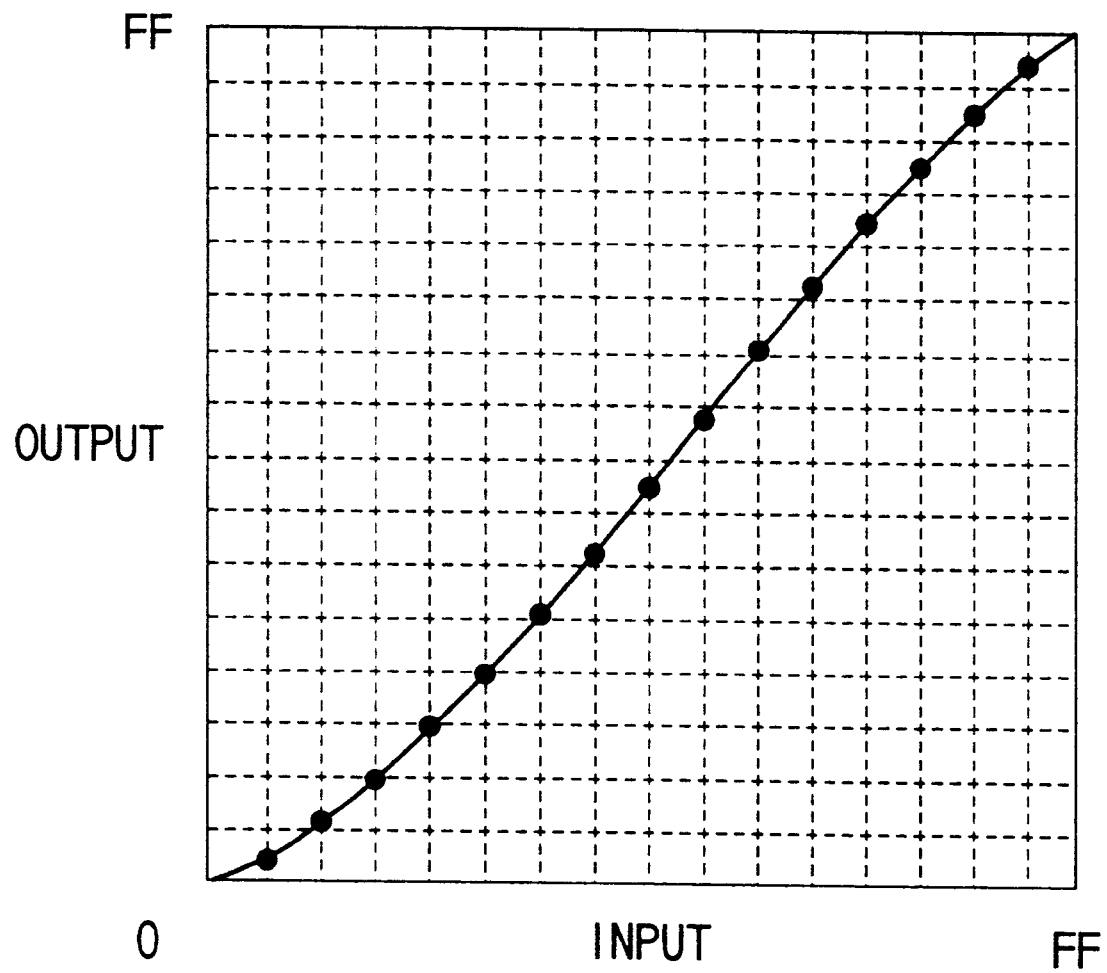
FIG. 8 shows the relationship between the value of each gradation in the resulting gradation pattern when the hard copy obtained by correcting the characteristic of the gradation pattern internally generated in the image processing section is supplied to the scanner section and the value of each gradation in the gradation pattern generated in the image processing section.

Next, using the value of each gradation thus obtained, the characteristic correction data item f2 is determined. When the abscissa represents the value of each gradation pattern P1 generated at the internal pattern generating section 131 and the ordinate represents the value of each gradation obtained through calculations after the scanner section 4 takes in the hard copy P2 from the printer section 6, there is an almost linear relationship between the input and the output as shown in FIG. 8.

That is, the second characteristic correction data item f2 is found which makes the inputted gradation pattern P3 have an almost linear relationship between the input and the output as the gradation pattern P1 generated at the internal pattern generating section 131. Therefore, the correction process can bring back the inputted gradation pattern P3 into the state of the originally generated gradation pattern P1 on the basis of the second characteristic correction data item f2.

When the characteristic correction data item f2 is found on the basis of an almost linear curve, that is, a curve having no nonlinear portions, defective data items resulting from the discontinuity of data and the reversal of numerical values due to noise can be eliminated, which makes the system less affected by noise.

Since the obtained relationship between the input and the output is represented by the data items skipping at regular intervals, not all the data items expressed in 8 bits (i.e., 256 values expressed in 8 bits), missing data items are interpolated by the following method. The number of data items interpolated need not be larger than the number of data items set in the characteristic correction section 134. For example, even if the input image data contains 8 bits, it is enough to interpolate as many data items as there are 128 values in 7 bits provided that the output image data contains 7 bits. An interpolation method is, for example, one of the following ordinary approaches:

Linear interpolation

Spline interpolation

Interpolation by a method of least squares

The missing data items are found by using one of these. For the curve representing the relationship between the input and the output obtained from the acquired data items, a curve contrasting with a straight line $y = x$ is found. The curve is determined to be a characteristic correction data item (referred to as a second correction data item f2). If a curve representing the relationship between the input and output obtained by interpolation is C, the second correction data item f2 can be found as follows:

$$f2[n] = i (n = 0, 1, 2, \ldots, 127)$$

where i fulfills the following expression $$i \leq C[i] < i+1 \ (n = 0, 1, 2, \ldots, 127)$$

f2: a second correction data item

C : a curve representing the relationship between the input and the output.

After the second correction data item f2 has been determined, a combination (referred to as a third correction data item f3) of the first correction data item f1 used for interpolation when the printer section 6 outputs a gradation pattern and the second correction data item f2 found from the relationship between the input data and the output data is stored as a usually used characteristic correction data item in a memory section, such as the NVRAM in the characteristic section 134. An example of a method of finding the third correction data item f3 will be shown below.

$$f3[n] = f2[f1[n]] (n = 0, 1, 2, \ldots, 127)$$

f1: a first correction data item
f3: a third correction data item

Then, the process of creating the characteristic correction data item f3 has finished. The created characteristic correction data item f3 (or the third correction data) is used in an actual image process. Specifically, in an actual image process, the image data read from the document D by the scanner section 4 is sent to the characteristic correcting section 134 via the correction data select section 132 that has selected the input image data from the scanner section 4 under the direction of the data select signal from the main CPU 91. Using the characteristic correction data item f3 (or the third correction data item) stored in a memory section, such as the NVRAM, the characteristic correcting section 134 corrects the gradation characteristic of the inputted image data and sends the corrected data as the output image data to the printer section 6 or the page memory 98.

As explained above, the discontinuity of data items or the reversal of numerical values is not corrected through complicated calculations. Instead, characteristic correction data items are found at two stages using the previously given characteristic correction data item so that even if the discontinuity of data items or the reversal of numerical values takes place, it may be suppressed to the extent that it has no adverse effect on the creation of the characteristic correction data items. Use of a combination of the characteristic correction data items of two different stages enables the difference between machines to be absorbed and makes the machine less affected by noise. This provides the characteristic correction data items as expected.

Therefore, the gradation characteristic of the input image data from the scanner section 4 is corrected using the thus obtained characteristic correction data items. This provides a copied image whose subtle half tone portions are optimized with a constantly stable picture quality.

4. Second Embodiment

A color image forming apparatus according to a second embodiment of the present invention will be explained in detail by reference to the accompanying drawings.

Figure 11:
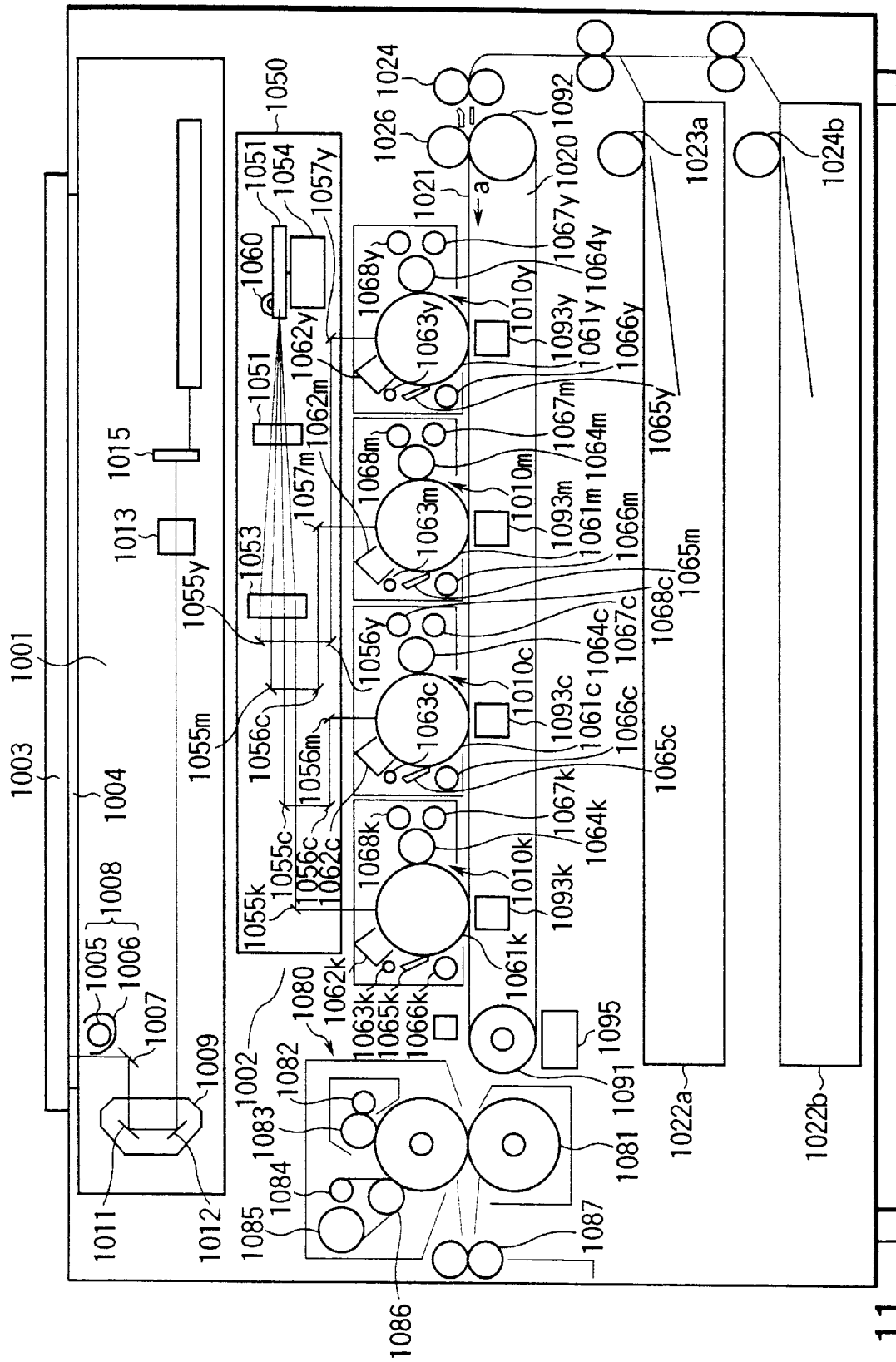
FIG. 11 is a side view of the internal configuration of a digital color copying machine according to a second embodiment of the present invention.
Figure 12:
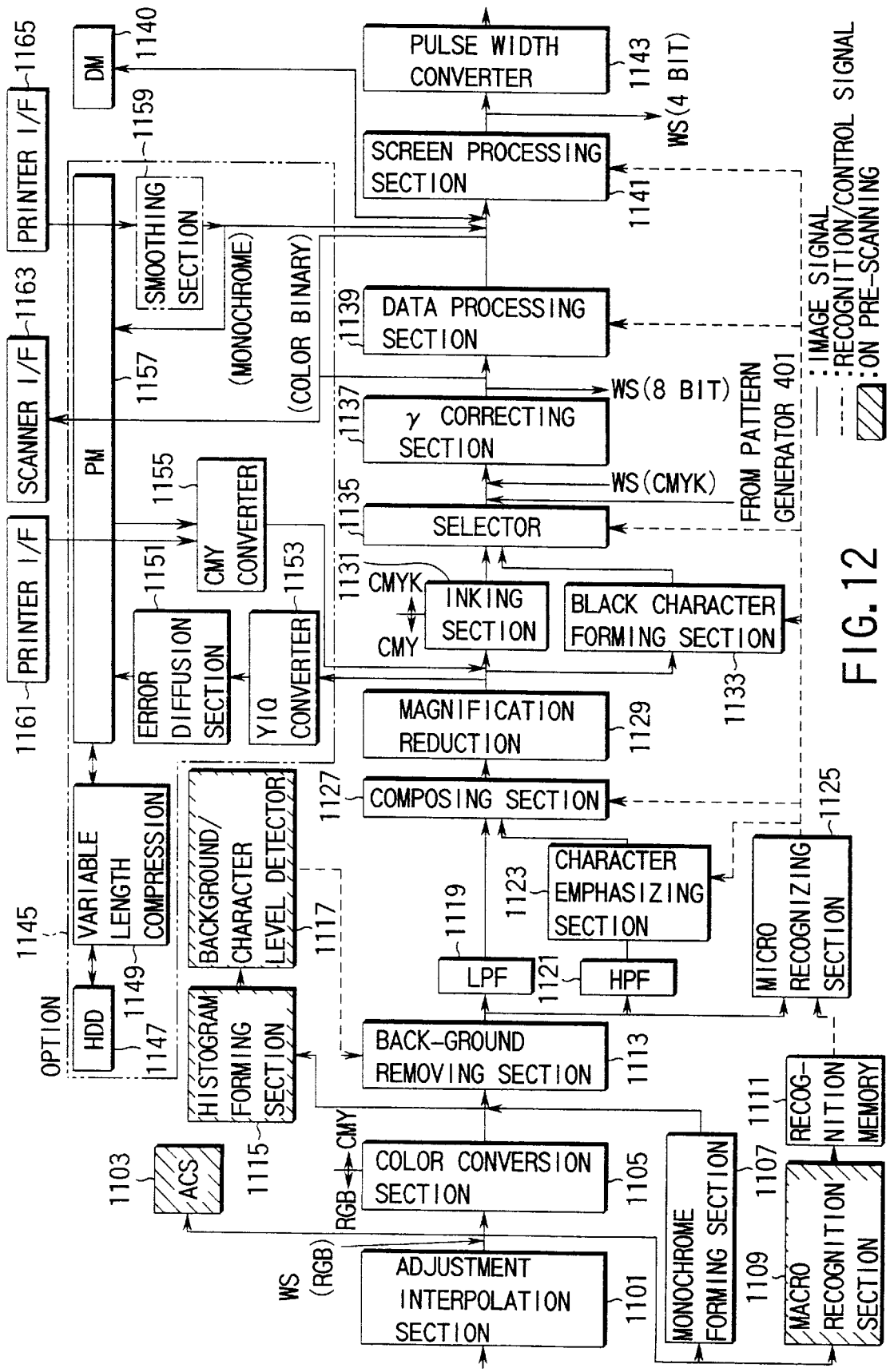
FIG. 12 is a block diagram of the digital color copying machine.
Figure 13:
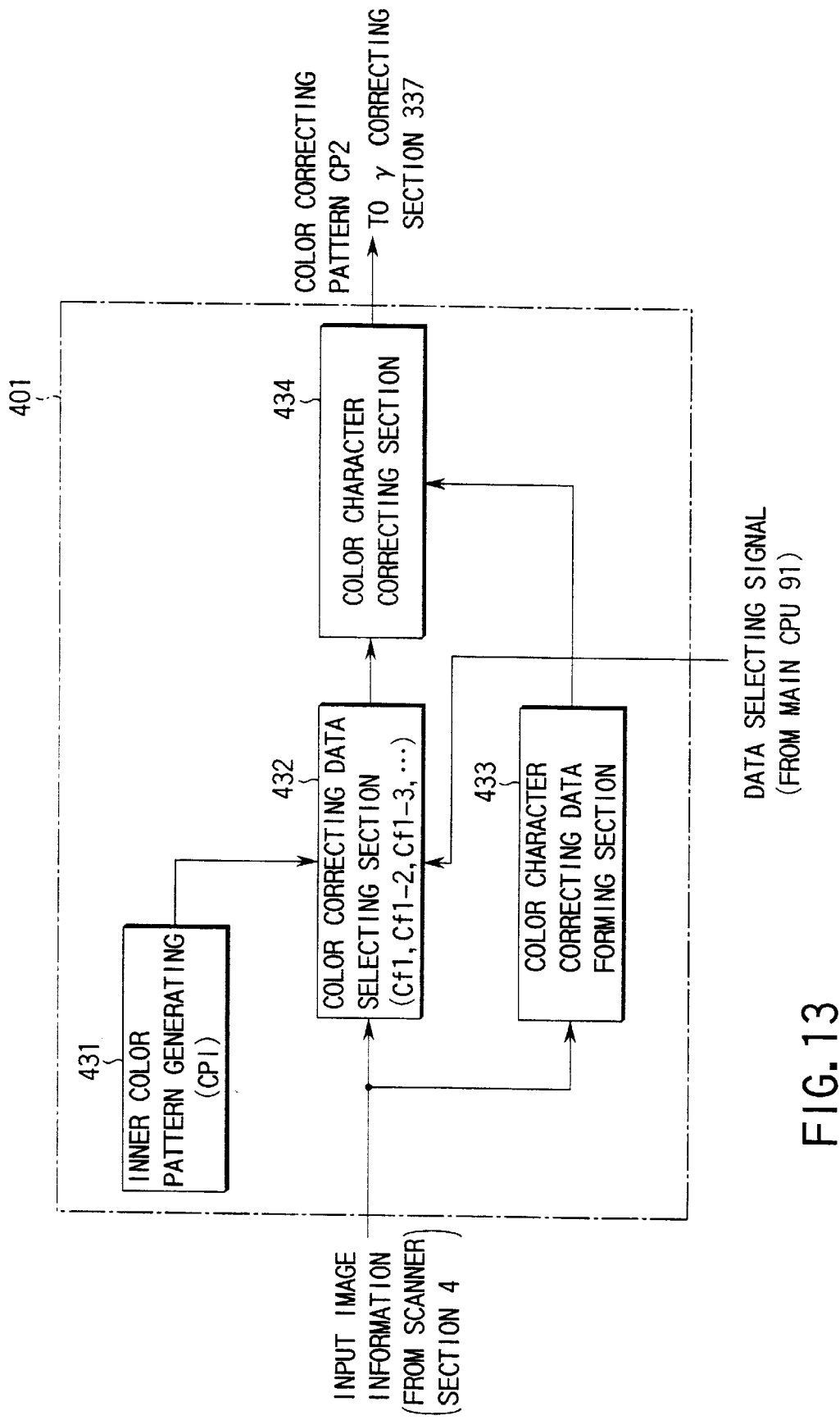
FIG. 13 is a block diagram of the color image processing section of the digital color copying machine.
Figure 14:
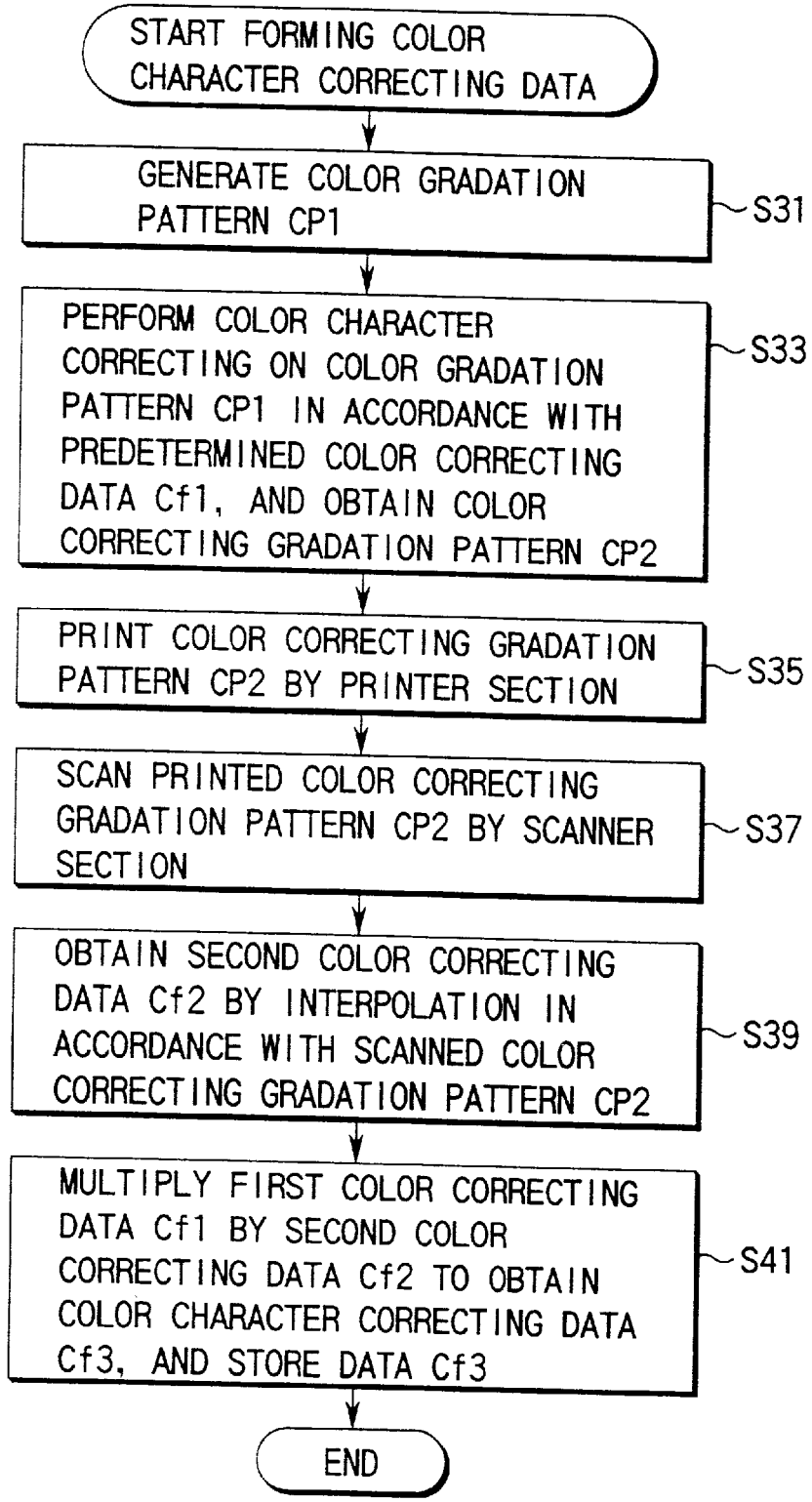
FIG. 14 is a flowchart to help explain a method of correcting the characteristic in the second embodiment.
Figure 15:
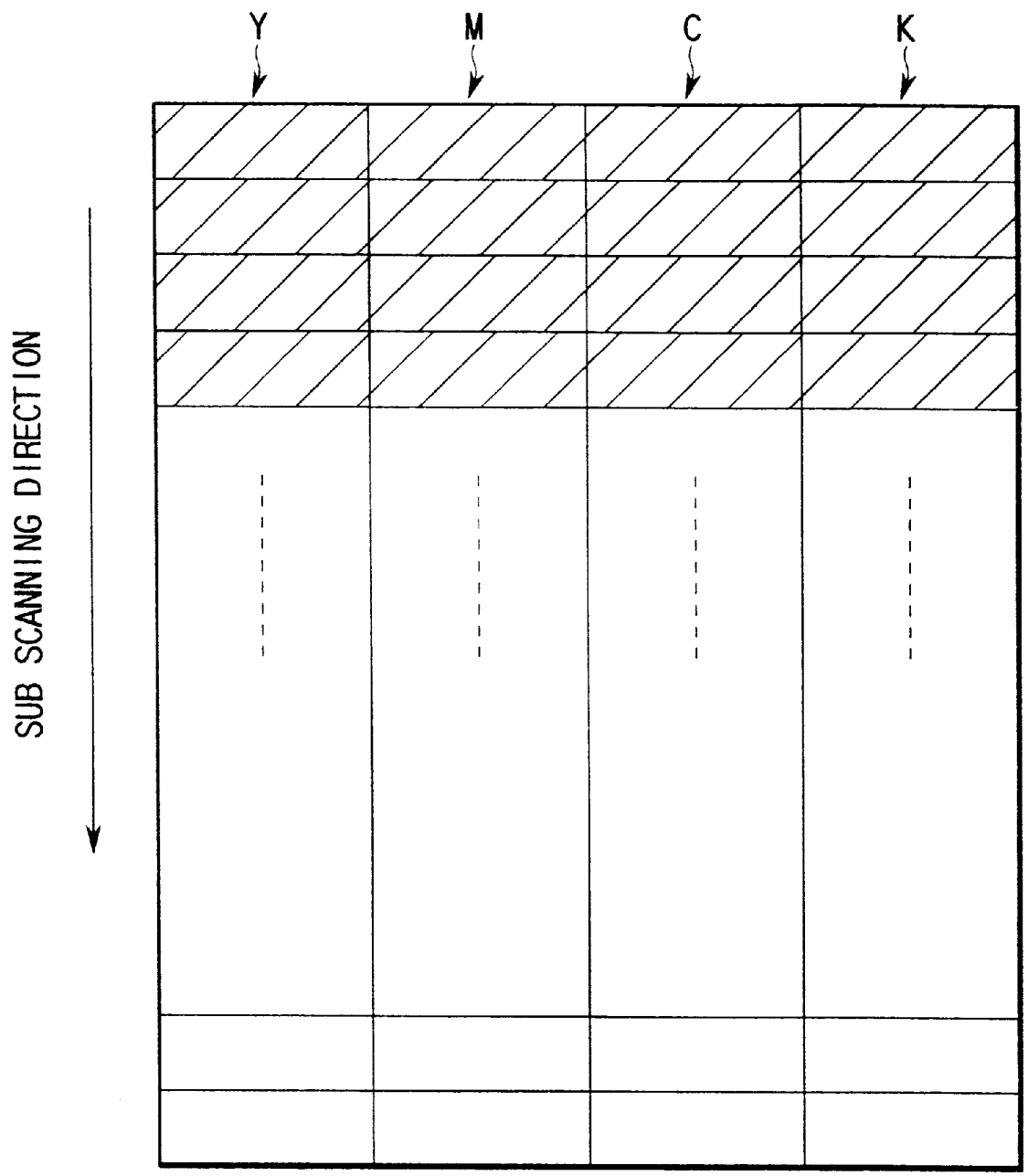
FIG. 15 shows an example of a color gradation pattern outputted on paper to provide a hard copy.

FIG. 11 is a side view of the internal configuration of a digital color copying machine according to a second embodiment of the present invention. FIG. 12 is a block diagram of the digital color copying machine. FIG. 13 is a block diagram of the color image processing section of the digital color copying machine. FIG. 14 is a flowchart to help explain a characteristic correction method in the second embodiment. FIG. 15 shows an example of a color gradation pattern printed on paper to form a hard copy.

In FIG. 11, a digital color copying machine 200 is composed of a scanner section 201 acting as a reading device and a printer section 202 acting as an image forming apparatus.

The scanner section 201 for reading the image on a document has a document table cover 203 on its top. The scanner section also has a document table 204 that is made of transparent glass and faces the document table cover 203 in the closed state. A document D is set on the document table. Below the document table 204, there are provided an exposure lamp 205 for illuminating the document D on the document table 4, a reflector 206 for gathering the rays of light from the exposure lamp 205 on the document D, and a first mirror 207 for deflecting the reflected light from the document D to the left in the figure. The exposure lamp 205, reflector 206, and first mirror 207 are fixed to a first carriage 208. The first carriage 208 is connected to a pulse motor (not shown) via a toothed belt (not shown). The first carriage receives the driving force of the pulse motor and moves in parallel with the document table 204.

In the figure, to the left of the first carriage 208, that is, in the direction in which the light reflected by the first mirror 207 is directed, a second carriage 209 is provided so as to move in parallel with the document table 204 via a driving mechanism (not shown), such as a toothed belt and a DC motor. On the second carriage 209, a second mirror 211 for deflecting downward the reflected light from the document D directed by the first mirror 207 and a third mirror 212 for deflecting the reflected light from the second mirror 211 to the right in the figure are provided at right angles to each other. The second carriage 209 follows the movement of the first carriage 208 in such a manner that it moves in parallel with the document table 204 at a speed half that of the first carriage 208.

In a plane including the optical axis of the light reflected via the second carriage 209, there is provided an image forming lens 213 for concentrating the reflected light from the second carriage 209 to form an image at a specific magnification. In a plane crossing at almost right angles with the optical axis of the light passed through the image forming lens 213, there is provided a CCD image sensor (photoelectric conversion element) 215 that converts the reflected light converged by the image forming lens 213 into an electric signal, or image data.

When the light from the exposure lamp 205 is gathered by the reflector 206 on the document D on the document table 204, the reflected light from the document D passes through the first mirror 207, second mirror 211, third mirror 212, and image forming lens 213 and strikes the CCD image sensor 215, which converts the light into image data.

The printer section 202 has a first to fourth image forming sections 210y, 120m, 210c, and 210k that produce images separated into the individual color components on the basis of a known subtractive color mixing method, that is, a yellow (hereinafter, referred to as y) image, a magenta (hereinafter, referred to as m) image, a cyan (hereinafter, referred to as c) image, and a black (hereinafter, referred to as k) image.

Below the image forming sections 210y, 210m, 210c, and 210k, there is provided a transport mechanism 220 including a transport belt 221 for transporting each color image formed at the corresponding image forming section in the direction of arrow a in the figure. The transport belt 221 is stretched between a driving roller 291 rotated in the direction of arrow a by a belt motor (not shown) and a driven roller 292 separated a specific distance apart from the driving roller 291. The transport belt is moved endlessly at a constant speed in the direction of arrow a. The image forming sections 210y, 210m, 210c, and 210k are arranged in series in the direction in which the transport belt 221 transports the image.

The image forming sections 210y, 210m, 210c, and 210k include photosensitive drums 261y, 261m, 261c, and 261k, respectively, acting as image retaining members. Each of the drums is formed so that its outer peripheral surface can rotate in the same direction at the position where it is in contact with the transport belt 221. A drum motor (not shown) for rotating each photosensitive drum at a specific circumferential speed is connected to each photosensitive drum.

The axes of the photosensitive drums 261y, 261m, 261c, 261k are arranged at regular intervals in such a manner that they cross at right angle with the direction in which the image is transported by the transport belt 221. In the following explanation, the direction of the axis of each photosensitive drum is determined to be the main scanning direction (a second direction) and the direction in which the photosensitive drum is rotated, or the direction (the direction of arrow a in the figure) in which the transport belt 221 rotates is determined to be the feed direction (a first direction).

Around the photosensitive drums 261y, 261m, 261c, 261k, charging devices 261y, 262m, 262c, 261k and discharging devices 263y, 263m, 263c, 263k extending in the main scanning direction, development rollers 264y, 264m, 264c, 264k, lower stirring rollers 267y, 267m, 267c, 267k, and upper stirring rollers 268y, 268m, 268c, 268k extending in the main scanning direction, transfer devices 293y, 293m, 293c, 293k extending in the main scanning direction, and cleaning blades 265y, 265m, 265c, 265k and waste toner collecting screws 266y, 266m, 26c, 266k extending in the main scanning direction are arranged in that order in the direction in which the photosensitive drum rotates.

Each transfer device is provided in a position where it presses the transfer belt 221 against the corresponding photosensitive drum, that is, inside the transport belt 221. The exposure point in the exposure device explained later is formed on the outer peripheral surface of the photosensitive drum between each charging device and the corresponding development roller.

Below the transport mechanism 220, there are provided paper feed cassettes 222a, 222b that house a plurality of sheets of recording paper P acting as image forming mediums to which the image formed by the image forming sections 210y, 210m, 210c, 210k is transferred.

At one end of each of the paper feed cassettes 222a, 222b and on the side closer to the driven roller 292, there are provided pickup rollers 223a, 223b that pick up, one by one, the sheets of recording paper P housed in the paper feed cassettes 222a, 222b, starting with the one at the top. Between the pickup rollers 223a, 223b and the driven roller 292, there is provided a resist roller 224 for aligning the leading edge of the recording paper sheet P taken out of the paper feed cassettes 222a, 22b with the leading edge of the y toner image formed on the photosensitive drum 261y of the image forming section 210y. The toner images (m, c, k) formed on the other photosensitive drums 211y, 211m, 211c are supplied to the respective transfer positions in synchronization with the transfer timing of the recording paper sheet P transported over the transport belt 221.

An adsorption roller 226 that gives a specific amount of adsorbability to the recording paper sheet P transferred with a specific timing via the resist roller 224 is provided between the resist roller 224 and the first image forming section 210y and near the driven roller 292, specifically on the outer peripheral surface of the driven roller via the transport belt 221. The axis of the adsorption roller 226 is arranged in parallel with the axis of the driven roller 292.

At one end of the transport belt 221 and near the driving roller 291, specifically on the outer peripheral surface of the driving roller 291 via the transport belt 221, there is provided a position shift sensor 296 for sensing the position of the image formed on the transport belt 221 is provided a specific distance apart from the driving roller 291. The position shift sensor 296 is composed of a transmitting type or a reflecting type of photodetector.

Above the peripheral surface of the driving roller 291 and on the transfer belt 221 on the downstream side of the position shift sensor 96, there is provided a transfer belt cleaning device 295 that removes the toner adhering onto the transfer belt 221 or paper dust of the recording paper sheet P.

In the direction in which the recording paper sheet P transported via the transport belt 221 and separated from the driving roller 291 is further transported, there is provided a fixing device 280 that melts the toner image transferred to the recording paper sheet P by heating the sheet P at a specific temperature and fixes the toner image on the sheet P. The fixing unit 280 is composed of a heat roller pair 281, oil applying rollers 282, 283, a web take-up roller 284, a web roller 285, and a web pressing roller 286. The toner image formed on the recording paper sheet P is fixed on the sheet, which is discharged by a delivery roller pair 287.

The exposure device 250 that forms a color-separated electrostatic latent image on the outer peripheral surface of each of the photosensitive drums has a semiconductor laser 260. The emission of light of the semiconductor laser is controlled on the basis of the image data items (y, m, c, k) of the respective colors into which the image is separated at the image processing device explained later. On the optical path of the semiconductor laser 260, there are provided, in this order, a polygon mirror 251 that is rotated by a polygon motor 254 and reflects and scans the laser beam and f θ lenses 252, 253 for correcting the focal point of the laser beam reflected by the polygon mirror 251 to form an image are provided.

Between the f θ lens 253 and each of the photosensitive drums 261y, 261m, 261c, 261k, there are provided first deflecting mirrors 255 (y, m, c, k) for deflecting the laser beam of each color passed through the f θ lens 253 toward the exposure position on the corresponding photosensitive drum and second and third deflecting mirrors 256 (y, m, c) and 257 (y, m, c) that further deflect the laser beams deflected by the first deflecting mirrors 255y, 255m, 255c. After being deflected by the first deflecting mirror 255k, the laser beam for black is directed to the photosensitive drum 261k without passing through another mirror.

Regarding the color image forming device 200, the block diagram of its electrical instrumentation is the same as that in the monochrome digital copying machine of FIG. 2. Therefore, explanation of that part will not be given.

The characteristic structure of the color image processing in the image processing section 96 will be described by reference to FIG. 12. As shown in FIG. 14, the image processing section 96 includes an adjustment interpolation section 301. The image processing section also includes a color conversion section 305, an ACS 303, a macro recognition section 309, and a recognition memory 311 each connected to the adjustment interpolation section. The image processing section further includes a background removing section 313, a histogram forming section 315, a background/character level detector 317, an LPF 319, an HEF 321, a character emphasizing section 323, and a micro recognition section 325, which are connected to the color conversion section, ACS, macro recognition section, and recognition memory. The image processing section 96 still further includes a combining section 327 that receives and combines the output of the LPF 319 and that of the character emphasizing section 323, an enlargement/reduction section 329 that enlarges and reduces the combined image, a black character forming section 333 and an inking section 331 each connected to the enlargement/reduction section, a selector 335 that selects one of the outputs of the black character forming section and the inking section, a γcorrection section 337, a data processing section 339, a screen processing section 341, and a pulse-width converter 343 that receives the output of the screen processing section 341. A DM 340 is connected to the data processing section 339.

The image processing section 96 has an optional section 345. The optional section 345 includes an HDD 347, a variable-length compression section 349 connected to the HDD, and a PM 357. The optional section also includes an error diffusion section connected to the PM and a YIQ converter 353 and a CMY converter 355 each connected to the enlargement/reduction section 329. A printer I/F 361 is connected to the CMY converter 355 via the PM 357. A scanner I/F 363 is connected to the data processing section 339. A printer I/F 365 is connected to the screen processing section 341 via a smoothing section 359.

Hereinafter, the function of each of the above-described sections will be explained in detail. In FIG. 12, the adjustment interpolation section 301 compensates for the position shift by interpolating the necessary data items in the image on the basis of the amount of shift. Specifically, in the enlargement and reduction functions, the main scanning operation is carried out by a digital process and the feed operation is performed by changing the moving speed of the scanner carriage. In the case of a structure using an RGB 3-line CCD sensor (with an 8-line pitch), there is no problem with a magnification of ×1 or integral multiples. At magnitudes other than these, a position shift takes place in the feed direction between R, G, and B. The position shift is corrected at the adjustment interpolation section 301.

The ACS 303 judges whether the document is a color document or a monochrome document. Specifically, the ACS makes the judgment during pre-scanning and switches between the color process and the monochrome process in a regular scanning.

In the color conversion section 305, although the scanner input signal is RGB, the printer signal is CMYK. Therefore, the conversion of color signal is necessary. In the color conversion, the RGB signal is converted into a CMY signal. The K signal is generated at the inking section 331. Color adjustment according to the user's taste is made by changing the parameters of color conversion.

The monochrome forming section 307 generates a monochrome signal from the RGB color signal in the monochrome copy mode.

The background removing section 313, histogram forming section 315, background/character level detector 317 remove the background of a document, such as the background of a newspaper. The histogram forming section creates a color density histogram of the document. From the values in the histogram, the color level of the background and the level of the characters are sensed. On the basis of the sensed levels, the background removing section 313 removes the background portions and outputs the character portions more densely.

The macro recognition section 309 judges the photograph area and the character area in the document. The macro recognition section judges the areas in broad perspective on the basis of the run image in the page memory. The run image has been obtained by prescanning the document.

The micro recognition section 325 judges the photograph area and the character area in the document. It makes a judgment referring to a local area with a size of about 3×3 pixels.

The LPF 319, HPF 321, and character emphasizing section 323 perform a spatial filter process, including noise removal, moire removal, and edge emphasis, and an emphasizing process of the character portions. The filter parameter is set for each area on the basis of the micro recognition data.

The enlargement/reduction section 329 performs an enlargement and reduction process in the main scanning direction.

The YIQ conversion section 353, error diffusion section 351, and CMY conversion section temporarily store the image in a memory in electronic sorting or in an image rotation process and reads the necessary part from the memory. Since it is necessary to read any area of the image or to read the image at a constant rate, a fixed-length compression/expansion process is needed. Use of a YIQ signal reduces the redundancy of color components and error diffusion helps maintain the gradation, while reducing the number of bits used.

The variable-length compression section 349 stores the image in an HDD when the electronic sorting function cannot get a sufficient memory capacity from only the page memory. Since there is a limit to the access speed of the HDD, the variable-length compression is effected at as high a compression efficiency as possible.

The inking section 331 generates a K signal from CMY, whereas the color conversion section 305 converts RGB into CMY.

The black character forming section 333 creates a black character. Since writing a black character all in black provides a high-quality picture in terms of color and resolution as compared with a stack of C, M, and Y, the micro recognition signal is used to switch between the inking and the formation of a black character.

The γcorrecting section 337 corrects the γcharacteristic of the printer. The γcorrection section sets a γtable for each of C, M, Y, and K.

The data processing section 339 performs a gradation process, including error diffusion. The data processing section converts the 8-bit input signal into a signal containing about 4 bits without degrading the gradation.

In the case of a quadruple tandem printer, each color has a different recording phase. Therefore, the DM (direct memory) 340 is used to delay the image of each color so that each color may have the same phase.

The screen processing section 341 inclines the screen of each color to suppress the occurrence of moire or color errors. In the case of a quadruple tandem printer, the direct output of each color causes moire or color errors because of a slight skew of each color or an error in the magnification. The screen processing section suppresses this.

Because the signal level and recording density in the image processing are not liner, the pulse-width converter 343 converts the pulse width by controlling the pulse driving time of the laser modulation section to achieve a linear characteristic.

With the above-described configuration, the color characteristic correction data is created according to the flowchart of FIG. 13.

A internal color pattern generating section 431 for generating a reference color image pattern CP1 is connected to the color correction data select section 432, which is connected to a color characteristic correcting section 434. The color correction data select section 432 receives the data select signal from the main CPU 91. The output of a color characteristic correction data forming section 433 for acquiring the image data from the scanner section 4 and creating the characteristic correction data is supplied to a color characteristic correcting section 434. The output of the color characteristic correcting section 434 is supplied to the γcorrecting section 337.

The operation of creating the color characteristic correction data in the second embodiment of the present invention will be described by reference to the flowchart of FIG. 14.

The operation of creating the color characteristic correction data is basically the same as in the above-described monochrome digital image forming apparatus. In FIG. 14, when the operator operates a specific key on the operation panel 80, this causes the characteristic correction data creation mode to be selected and an operation start instruction to be inputted. As a result, the internal color pattern generating section 431 generates a color gradation pattern CP1 whose density changes stepwise (S31). The generated color gradation pattern CP1, together with one correction data item Cf1 selected from a plurality of correction data items (Cf1, Cf1-2, Cf1-3, . . . ) according to the data select signal supplied from the main CPU 91, is sent to the color characteristic correcting section 434.

The operator enters the correction data item from the operation panel of FIG. 17 as in the monochrome digital image forming apparatus.

The color characteristic correcting section 134 corrects the color gradation pattern CP1 from the internal color pattern generator 431 using the given correction data item Cf1 and sends the corrected color gradation pattern CP2 to the printer section 6 (S33). The printer section 6 prints the corrected color correction pattern CP2 from the color characteristic correcting section 434 on a sheet of paper P to provide a hard copy (S35).

FIG. 15 shows an example of a hard copy of the color correction pattern CP2. Since the hard copy is a color image, it has the gradation image of each of cyan C, magenta M, yellow Y, and black K.

The first color correction data item Cf1 used in the color characteristic correcting section 134 is used to correct the degree of the deflection of the color signal to the printer. Therefore, the first color correction data item Cf1 is divided into color correction data items about cyan C, magenta M, yellow Y, and black K. The supplied image signal is corrected using the color correction data item Cf1 to produce a color correction pattern CP2. Supplying the color correction pattern CP2 to the printer provides a substantially linear characteristic, although the deflection of the characteristic of the printer system is not complete. That is, the correction corresponds to the case where the deflected curve of FIG. 6 is corrected to a linear one in the monochrome digital image forming apparatus, except that the color correction is made for each of the four color signals.

The color hard copy CP2 outputted from the printer section 6 is set in the scanner section 4, which reads it as the color correction pattern CP3 of the color hard copy (S37). The value of each gradation of the read color gradation pattern CP3 is found by sampling data on each gradation of the gradation pattern. The process is carried out for each of cyan C, magenta M, yellow Y, and black K.

A concrete method of determining the value of each gradation is almost the same as in the monochrome digital image forming apparatus.

Next, using the determined value of the gradation of each color, the second color characteristic correction data item Cf2 is found. The second color characteristic correction data item Cf2 is a correction data item used to correct the deflection including the deflection in the scanner section 4 to achieve a near-perfect linearity as in the monochrome digital image forming apparatus. This is basically the same as with the curve of FIG. 8 having a corrected linearity in the monochrome digital image forming apparatus.

A method of finding the second color characteristic correction data Cf2 is basically the same as in the interpolation process in the monochrome digital image forming apparatus, except that the interpolation process is carried out for each of cyan C, magenta M, yellow Y, and black K (S19).

After the second color characteristic correction data item Cf2 has been obtained, the first color characteristic correction data item Cf1 used in the correction when the printer section 6 outputted the color gradation pattern CP1 is combined with the second color characteristic correction data item Cf2 for each of cyan C, magenta M, yellow Y, and black K to produce a third color characteristic correction data item Cf3. This is stored as a normally used characteristic correction data item in the memory section, such as an NVRAM, in the characteristic correcting section 434 (S41). The method of creating the third color characteristic data item is the same as in the monochrome digital image forming apparatus.

The first, second, and third correction data items of the invention are, for example, the digital density correction data items corresponding to the digital density data items at 256 stages in a one-to-one ratio according to the deflection of the printer system (or the scanner system). For example, the correction data item "48" corresponds to the digital density data "50" and the correction data item "49" corresponds to the digital density data item "51". The finest correction data items are the digital correction density data items "1" to "253" corresponding to the digital density data items "0" to "255" in a complete one-to-one ratio.

These correction data items may correspond to the digital density data items in a more rough ratio, for example, in a three-to-one ratio, instead of a complete one-to-one ratio. The correction data items may be function data items expressed by a suitable function. In the case of the color digital copying machine, the correction data items are prepared for each of cyan C, magenta M, yellow Y, and black K.

As described above, with the present invention, the characteristic correction data items are prepared at two stages to correct the deflection for each copying machine body. The correction data item at the first stage is used to correct the deflection in the output system including the printer section. The correction data item at the second stage is used to correct the deflection in the input system including the scanner section. These two types of correction data items are combined to generate a third correction data item for the entire system. The third correction data item is set as a correction data item for use in ordinary image processing. This makes it possible to provide an image forming apparatus capable of correcting the deflection for each copying machine and realizing an ideal linear relationship (see FIG. 8) between the input and the output as expected at the design stage.

Accordingly, it is possible to provide an image processing method and image processing apparatus that are capable of creating characteristic correction data items as expected without being affected by the discontinuity of data items and the reversal of numerical values due to noise, when characteristic correction data items for correcting the input and output characteristics of the entire system for each copying machine are created.

Furthermore, it is possible to provide a monochrome or color digital copying machine with a very high reproducibility of density that causes the shading image of the read document to be reproduced with fidelity by the density correction process.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method which reads an image on a document by means of a scanner section that serves as an input device, and which prints the read image on a sheet by means of a printer section as a hard copy, said method comprising:

a first inputting step for setting a characteristic correction data preparation mode on an operation panel, and for inputting an operation start command;

a first generating step, executed in response to input of the operation start command in the characteristic correction data preparation mode, for generating a first reference gradation pattern P1, said first reference gradation pattern P1 serving as an ideal reference pattern and includes image signals that change stepwise in a sub-scanning direction;

a displaying step for displaying information regarding a plurality of first correction data f1 that are selectable by an operator using the operation panel, said first correction data f1 including a correction curve which is used when a gradation characteristic of the hard copy is entered from the scanner section and which enables a substantially linear relationship between uncorrected signals and signal components that have been input corresponding to output signals;

a first transmitting step for transmitting the first reference gradation pattern P1 and the first correction data f1 selected by using the operation panel to a characteristic correcting section in response to a data selection signal which is issued by a main processor in accordance with the selection by the operator;

a second transmitting step for causing the characteristic correcting section to correct the first reference gradation pattern P1 by use of the first correction data f1 and transmitting a second reference gradation pattern P2, obtained by correction, to the printer section;

a first printing step for causing the printer section to print the transmitted second reference gradation pattern P2 on a sheet as a hard copy that has a substantially linear characteristic;

a first reading step for causing the scanner section to read the hard copy of the second reference gradation pattern P2, thereby obtaining a third reference gradation pattern P3;

a third transmitting step for transmitting the third reference gradation pattern P3, obtained in the first reading step, to a characteristic correction data forming section;

a gradation determining step for sampling data of the third reference gradation pattern P3 for each gradation, thereby determining values for respective gradations;

a second generating step for generating second correction data f2 by use of a value for each gradation determined in the gradation determining step, the second correction data f2 enabling inputs and outputs to have the substantially linear relationship when values of the first reference gradation pattern P1 are plotted along one of an abscissa or ordinate axis and the determined values for the respective gradations are plotted along the other of the abscissa or ordinate axis;

a third generating step for synthesizing the second correction data f2 generated in the second generating step with the first correction data f1 displayed in the displaying step, thereby generating third correction data f3;

an second inputting step for selecting an ordinary image processing mode by operating the operation panel and inputting the operation start command;

a second reading step for causing the scanner section to read the image on the document, thereby obtaining image information;

a fourth transmitting step for causing a selection section to select the image information regarding the read image of the document in accordance with the data selection signal from the main processor, and transmitting the selected image information to the characteristic correcting section;

a correcting step for causing the characteristic correcting section to correct a gradation characteristic of the image information regarding the read image by use of the third correction data f3; and a second printing step for causing the printer section to print the image information as the hard copy, the printed image information being information whoso gradation characteristics have been corrected.

2. The image forming method according to claim 1, wherein said gradation determining step comprises the sub-steps of:

sampling the values of gradations in such a manner that highly-stable portions of the third reference graduation pattern P3, which are other than peripheral portions of the gradations, are sampled and no pixel is selected from among a predetermined number of pixels, and dividing a sum total of sampled pixel values by a sum total of sampled pixels, for each gradation, thereby determining values of corresponding gradations.

3. The image forming method according to claim 1, wherein the displaying step for displaying information regarding the plurality of first correction data f1 includes a selection screen for displaying information regarding the plurality of first correction data f1.

4. An image forming apparatus which reads an image on a document comprising:

a scanner section that serves as an input device for reading the image;

a printer section that prints the read image as a hard copy;

an operation panel for indicating a characteristic correction data preparation mode on the operation panel, and for inputting an operation start command, said operation panel displaying information regarding a plurality of first correction data f1 that are selectable by an operator, wherein said first correction data f1 including a correction curve which is used when a gradation characteristic of the hard copy is entered from the scanner section and which enables a substantially linear relationship between uncorrected signals and signal components that have been input corresponding to output signals;

an image processing section comprising an inner pattern generating section for generating a first reference gradation pattern P1 in response to input of the operation start command in the characteristic correction data preparation mode, said first reference gradation pattern P1 serving as an ideal reference pattern and including image signals that change stepwise in a sub-scanning direction, a characteristic correcting section that corrects the first reference gradation pattern P1 by use of the first correction data f1 and transmits a second reference gradation pattern P2, obtained by correction, to the printer section, and a data selecting section for transmitting the first reference gradation pattern P1 and the first correction data f1 selected by using the operation panel to the characteristic correcting section in response to a data selection signal which is issued by a main processor in accordance with the selection by the operator;

wherein said printer section prints the transmitted second reference gradation pattern P2 on a sheet as a hard copy that has a substantially linear characeristic;

wherein said scanner section reads the hard copy of the second reference gradation pattern P2, thereby obtaining a third reference gradation pattern P3;

wherein the image processing section further comprises a characteristic correcting data forming section that inputs the third reference gradation pattern P3, samples data of the third reference gradation pattern P3 for each gradation, thereby determining values for respective gradations, and generates a second correction data f2 by use of the determined values for each gradation, the second correction data f2 enabling inputs and outputs to have the substantially linear relationship when values of the first reference gradation pattern P1 are plotted against one of an abscissa axis or an ordinate axis and the values for the respective gradations are plotted against the other of the abscissa axis or the ordinate axis;

wherein the characteristic correcting section synthesizes the second correction data f2 with the first correction data f1 to thereby generate a third correction data f3;

wherein the operation panel provides for selecting an ordinary image processing mode and inputting the operation start command and by which said scanner section reads the image on the document, thereby obtaining image information, and said data selecting section selects the image information regarding the read image of the document in accordance with the data selection signal from the main processor, and transmits the selected image information to the characteristic correcting section; and wherein the characteristic correcting section correct the gradation characteristic of the image information regarding the read image by use of the third correction data f3, and said printer section prints the image information as a hard copy, the printed image information being information whose gradation characteristics have been corrected by the characteristic correcting section using the third correction data f3.

5. The image forming apparatus according to claim 4, wherein the characteristic correcting data forming section comprises:

means for sampling the values of gradations in such a manner that highly-stable portions, which are other than peripheral portions of the gradations, are sampled and no pixel is selected from among a predetermined number of pixels, and means for dividing a sum total of sample pixel values by a sum total of sample pixels for each gradation, thereby determining values of corresponding gradations.

6. The image forming apparatus according to claim 4, wherein the operation panel comprises a selection screen for displaying information regarding the plurality of first correction data f1 selectable by the operator.

* * * * *